United States Patent
Lee et al.

(10) Patent No.: US 11,522,379 B2
(45) Date of Patent: Dec. 6, 2022

(54) DEVICE FOR SUPPLYING POWER TO EXTERNAL DEVICE AND METHOD THEREFOR

(71) Applicant: Samsung Electronics Co., Ltd., Suwon-si (KR)

(72) Inventors: Min Young Lee, Suwon-si (KR); Cheol Ho Lee, Suwon-si (KR); Cheol Yoon Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 610 days.

(21) Appl. No.: 16/473,967

(22) PCT Filed: Feb. 12, 2018

(86) PCT No.: PCT/KR2018/001842
§ 371 (c)(1),
(2) Date: Jun. 26, 2019

(87) PCT Pub. No.: WO2018/147703
PCT Pub. Date: Aug. 16, 2018

(65) Prior Publication Data
US 2019/0341786 A1 Nov. 7, 2019

(30) Foreign Application Priority Data
Feb. 10, 2017 (KR) .......................... 10-2017-0018760

(51) Int. Cl.
*H02J 7/00* (2006.01)
*G06F 1/3234* (2019.01)

(52) U.S. Cl.
CPC ........ *H02J 7/00712* (2020.01); *G06F 1/3275* (2013.01); *H02J 7/00304* (2020.01); *H02J 7/00* (2013.01); *H02J 7/0042* (2013.01)

(58) Field of Classification Search
USPC .......................................................... 320/116
See application file for complete search history.

(56) References Cited

U.S. PATENT DOCUMENTS 3,185,283 A * 5/1965 Spitsbergen ............. B41J 11/44
400/583.2
9,368,982 B2 6/2016 Jansen et al.
(Continued)

FOREIGN PATENT DOCUMENTS

JP          3198095 U      6/2015
KR   10-2014-0099741 A     8/2014
(Continued)

OTHER PUBLICATIONS

ISA/KR, "International Search Report and Written Opinion of the International Searching Authority," International Application No. PCT/KR2018/001842, dated Jun. 5, 2018, 13 pages.

*Primary Examiner* — Mohammed Alam

(57) ABSTRACT

Disclosed is an electronic device. The electronic device may include a plurality of interfaces each of which is connected to one peripheral electronic device in a wired manner to deliver power to the connected peripheral electronic device, a power supply circuit connected to the plurality of interfaces, and a control circuit including a plurality of pins each connected to one interface to allow the power supply circuit to supply power to the plurality of interfaces. In addition, various embodiments understood from the disclosure are possible.

12 Claims, 11 Drawing Sheets

(56) References Cited

U.S. PATENT DOCUMENTS

| | | |
|---|---|---|
| 9,431,841 B2 | 8/2016 | Inha et al. |
| 9,496,726 B2 | 11/2016 | Frid et al. |
| 9,891,680 B2 | 2/2018 | Hijazi et al. |
| 10,110,031 B2 | 10/2018 | Lee |
| 2012/0187921 A1* | 7/2012 | Platania ................ H02M 3/158 320/140 |
| 2014/0208134 A1 | 7/2014 | Waters et al. |
| 2014/0217962 A1 | 8/2014 | Kim et al. |
| 2015/0035476 A1 | 2/2015 | Frid et al. |
| 2015/0038006 A1 | 2/2015 | Jansen et al. |
| 2015/0194834 A1 | 7/2015 | Lee |
| 2015/0263638 A1* | 9/2015 | Yang ....................... H02M 7/04 363/125 |
| 2015/0270733 A1 | 9/2015 | Inha et al. |
| 2016/0139642 A1 | 5/2016 | Hijazi et al. |
| 2017/0117727 A1* | 4/2017 | Chen ..................... H02J 7/0068 |
| 2017/0147052 A1 | 5/2017 | Waters et al. |
| 2019/0341786 A1* | 11/2019 | Lee ......................... H02J 7/342 |
| 2020/0266627 A1* | 8/2020 | Ha ......................... H02J 7/0016 |

FOREIGN PATENT DOCUMENTS

| | | |
|---|---|---|
| KR | 10-2015-0081754 A | 7/2015 |
| WO | 2014051610 A1 | 4/2014 |

\* cited by examiner

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1− | $V_{BUS}$ | CC1 | D+ | D− | SBU1 | $V_{BUS}$ | RX2− | RX2+ | GND |
| GND | RX1+ | RX1− | $V_{BUS}$ | SBU2 | D− | D+ | CC2 | $V_{BUS}$ | TX2− | TX2+ | GND |
| B12 | B11 | B10 | B9 | B8 | B7 | B6 | B5 | B4 | B3 | B2 | B1 |

FIG.2

DEVICE FOR SUPPLYING POWER TO EXTERNAL DEVICE AND METHOD THEREFOR

CROSS-REFERENCE TO RELATED APPLICATIONS

This application is a 371 National Stage of International Application No. PCT/KR2018/001842, filed Feb. 12, 2018, which claims priority to Korean Patent Application No. 10-2017-0018760, filed Feb. 10, 2017, the disclosures of which are herein incorporated by reference in their entirety.

BACKGROUND

1. Technical Field

Embodiments disclosed in the disclosure relate to a device for supplying power to an external device connected thereto in a wired manner and a method thereof.

2. Description of Related Art

A host device (e.g., a personal computer) may supply charging power through a wired interface to various external devices (e.g., mobile terminal, tablet PC).

Recently, electronic devices may charge a battery, stream audio and video, and transmit data through a wired interface using a single cable. As one cable may be compatible with multiple devices, research is being actively conducted on wired interfaces that provide high charging power according to an external device connected to the electronic device. As power available from a device for supplying power increases, it is required to connect several devices to increase convenience of a user.

SUMMARY

According to the related art, a plurality of control circuits or controllers need be used to connect a plurality of devices, which increases a design cost.

When power is supplied to a plurality of peripheral electronic devices according to the related art, problems such as high voltage/high current components, increase in cable thickness, and increase in heat may occur.

Various embodiments disclosed herein address the problems of the above-mentioned power control circuit and provide an electronic device capable of being connected to several peripheral electronic devices at a lower design cost.

Various embodiments disclosed herein provide an electronic device capable of controlling a charging current supplied to a plurality of peripheral electronic devices.

According to another embodiment of the disclosure, an electronic device may include a plurality of interfaces each connected to one peripheral electronic device in a wired manner to deliver power to the connected peripheral electronic device, a power supply circuit connected to the plurality of interfaces, and a control circuit including a plurality of pins each connected to one interface to allow the power supply circuit to supply power to the plurality of interfaces.

According to another embodiment of the disclosure, an electronic device may include at least two or more interfaces connected to at least two or more peripheral electronic devices in a wired manner to deliver power to the connected peripheral electronic devices, a power supply circuit connected to the at least two or more interfaces, and a control circuit including one pin connected to the at least two or more interfaces. The control circuit may recognize whether a peripheral electronic device is connected to at least one of the at least two or more interfaces using the one pin, and the power supply circuit supplies power to the at least two or more interfaces.

According to still another embodiment of the disclosure, an electronic device includes a plurality of interfaces each connected to one universal serial bus (USB) device to deliver power to the connected USB device, a power receiving interface connected to a host device to receive power from the connected host devices, a power supply circuit connected to the power receiving interface and the plurality of interfaces to supply power received via the power receiving interface to the plurality of interfaces, and a control circuit including a plurality of pins each connected to one interface.

According to still another embodiment of the disclosure, an electronic device may include two or more interfaces including at least one first type terminal for power delivery and a second type terminal for obtaining information on a connected external electronic device and communicating with the connected external electronic device and connected to at least two external electronic devices in a wired manner, a power supply unit for delivery power to the at least two interfaces and a control circuit connected to at least one of the first type terminal or the second type terminal of the at least two interfaces. The control circuit may control the power supplied by the power supply unit to the connected external electronic device according to the connected external electronic device.

According to the embodiments disclosed herein, it is possible to optimize a charging speed of a peripheral electronic device without increasing a design cost.

In addition, various effects may be provided that are directly or indirectly understood through the disclosure.

BRIEF DESCRIPTION OF THE DRAWINGS

FIG. 2 is a structural diagram of an interface according to an embodiment;

DETAILED DESCRIPTION

Figure 1:
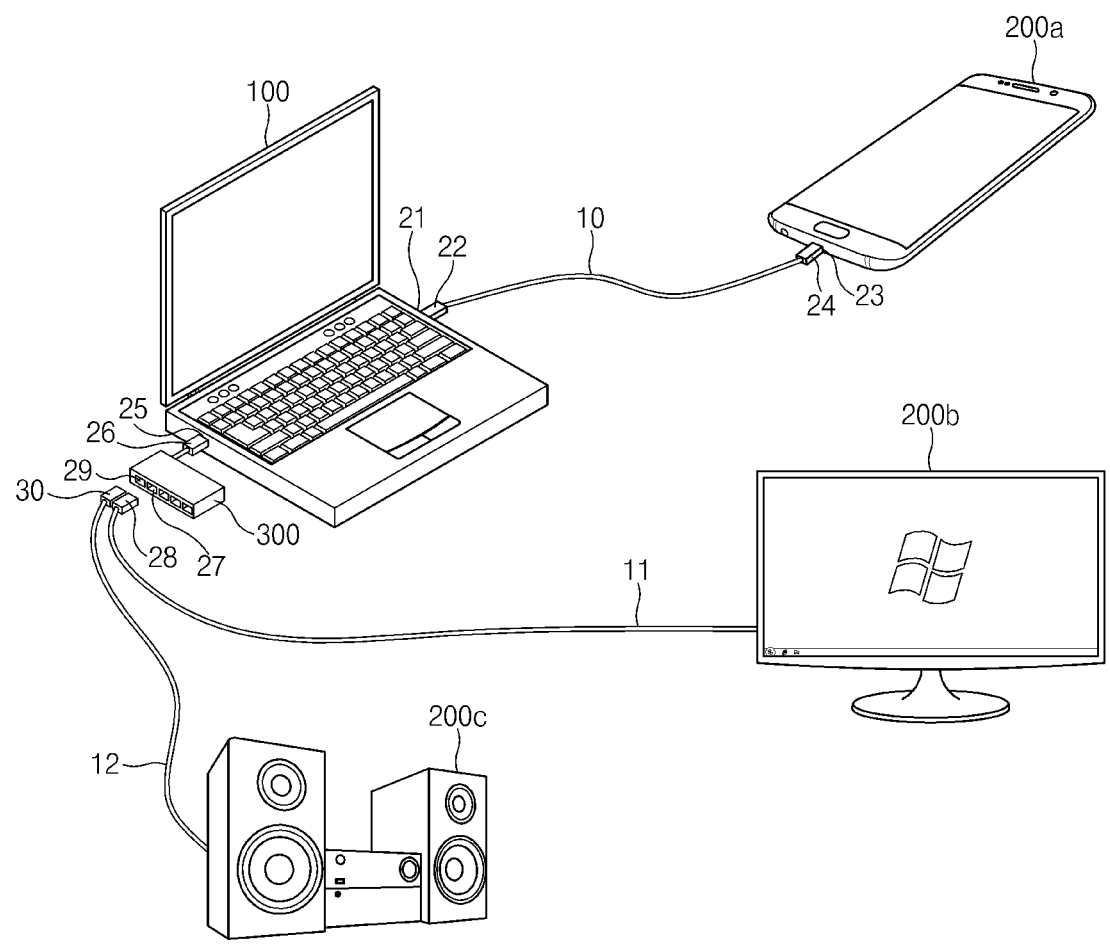
FIG. 1 illustrates a network environment of an electronic device applicable to various embodiments.

Hereinafter, various embodiments of the disclosure may be described with reference to accompanying drawings.

Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (10) where at least one B is included, or the case (11) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 illustrates an operational environment of an electronic device 100 according to various embodiments.

Referring to FIG. 1, the electronic device 100 may be connected to peripheral electronic devices 200a, 200b, and 200c through a plurality of interfaces 21 and 25. The electronic device 100 may be wired to the peripheral electronic devices 200a, 200b, and 200c through the plurality of interfaces 21 and 25. The electronic device 100 may be connected to the peripheral electronic device 200a through a cable. The electronic device 100 may be connected to the peripheral electronic devices 200b and 200c through a connection device 300. The electronic device 100 may include the plurality of interfaces 21 and 25. The electronic device 100 may supply power to various devices through the plurality of interfaces 21 and 25.

The peripheral electronic devices 200a, 200b, and 200c may include at least one interface (e.g., 23). The peripheral electronic devices 200a, 200b, and 200c may include various devices. For example, the peripheral electronic devices 200a, 200b, and 200c may be a device equipped with an interface applicable to the disclosure, such as an audio device for providing audio streaming, a display device for providing video streaming, a portable phone, a user terminal, or the like.

The connection device 300 may be a device including multiple interfaces (e.g., 27 and 29) to convert the connection specifications of the cable and/or to connect multiple peripheral electronic devices using a single interface 26. In one embodiment, the connection device 300 may be a hub or a gender. In one embodiment, the connection device 300 may be a universal serial bus (USB) hub or a USB gender including multiple interfaces. The connection device 300 may be connected to the peripheral electronic devices 200b and 200c using cables 11 and 12.

The cables 10, 11, and 12 may provide connections between the electronic device 100 and the peripheral electronic devices 200a, 200b, and 200c through interfaces (e.g., 21 and 23). In one embodiment, interfaces (e.g., 21 and 23) on both sides may include pins capable of obtaining information about connected devices. In one embodiment, at least one cable (e.g., 10) may support bi-phase mark code (BMC) communication. In one embodiment, at least one cable (e.g., 10) may transmit and receive signals between devices through a configuration channel (CC) or a CC wire. In one embodiment, at least one of the cables 10, 11, 12 may be an interface that supports Power Delivery (PD) and/or USB Type-C. In one embodiment, at least one of the interfaces (e.g., 21, 23) on both sides of the cable 10, 11, or 112 may be an interface that supports PD and/or USB Type-C.

The interfaces 21 to 30 may be interfaces for the electronic device 100, the peripheral electronic devices 200a, 200b, and 200c, or the cables 10, 11, and 12. The interfaces (e.g., 21 to 30) may be USB interfaces. According to various embodiments of the disclosure, at least one of the interfaces 21 to 30 may include a terminal coupled to a pin capable of obtaining information about a connected device. In one embodiment, at least one (e.g., 21) of the interfaces may be a USB type-C interface. In one embodiment, at least one (e.g., 21) of the interfaces may support PD. The interfaces 21 to 30 may be interfaces exposed by a receptacle or a plug. The interfaces 21 to 30 may be logically ports. Alternatively, the interfaces 21 to 30 may be physically connectors. The connector may include a plug or a receptacle. The connectors 22, 24, 28 and 30 provided at ends of the cables 10, 11, and 12 may be plugs or jacks. A connector 26 provided in the connection device 300 and coupled to a receptacle of another device (e.g., the electronic device 100) may be a plug. A connector coupled to a panel of the electronic device 100, the peripheral electronic device 200a, 200b, or 200c or the connection device 300 may be a receptacle 21, 23, 25, 27, or 29.

The electronic device 100 may supply or receive power to or from the peripheral electronic device 200a connected through the cable 10.

The connection device 300 may deliver power, received through the electronic device 100, to the peripheral electronic devices 200b or 200c via the cable 11 or 12, or deliver power, received from at least one of the peripheral electronic devices 200b or 200c, to the electronic device 100.

The peripheral electronic devices 200a to 200c may receive power from electronic device 100 or deliver power to electronic device 100 through the cables 10, 11 or 12 or the connection device 300.

Although an electronic device is described assuming that a USB interface is provided, but various interfaces may be applicable to various embodiments disclosed in the disclosure.

In the following description, it is assumed that the electronic device 100 delivers power to the peripheral electronic devices 200a, 200b, and 200c. The electronic device 100 may be referred to as a source device or source port below. The peripheral electronic devices 200a, 200b, and 200c may be referred to as sink devices or sink ports.

A source port may be a power supply port that delivers power through a power supply terminal (e.g., VBUS). A source may be mainly a host, a hub, or a downstream facing port (DFP). A sink port is a port for consuming power received through the VBUS. A sink may be mainly a device.

A USB host may be a host computer system in which a USB host controller is installed. A PD USB host may refer to a USB host operating in a DFP (downstream face port) mode capable of supporting PD. A PD USB device may refer to a device operating in a UFP (upstream face port) mode supporting PD. The PD USB device may be a hub or a peripheral electronic device (e.g., 200a, 200b or 200c). DFP or UFP may be determined at the time of connecting ports. Hereinafter, various embodiments disclosed in the disclosure will be described on the assumption that the electronic device 100 operates in the DFP mode.

A PD USB hub may refer to a port-expanding USB device with a UFP that supports PD and one or more DFPs. A PD USB peripheral electronic device may refer to a USB device with a UFP that supports PD rather than a PD USB hub. Each PD USB device may support SOP packets (SOP, SOP' and SOP"). An SOP packet may refer to a power delivery packet beginning with an SOP.

When the electronic device 100 enters a DFP mode, the electronic device 100 may function as a USB host for the peripheral electronic devices 200a, 200b, and 200c. Alternatively, when the electronic device 100 enters the DFP mode, the electronic device 100 may function as a source for delivering power to the peripheral electronic devices 200a, 200b, and 200c or operate as a hub.

When entering a UFP mode, the peripheral electronic device 200a, 200b, or 200c may function as a USB device for the electronic device 100 or operate as a sink that receives power.

A provider may correspond to a port provided with a pull-up resistor Rp on a CC wire. A port with a pull-up resistor may correspond to a source. The provider may include one or more source ports. The host or the hub may correspond to the provider. In the following description of the disclosure, the provider or the source may be referred to as the electronic device 100 or the connection device 300.

A consumer may correspond to a port provided with a pull-down resistor Rd on the CC wire. The consumer may draw power from a power provider. The consumer may include a single sync port. A port with a pull-down resistor may correspond to a sink. The consumer may correspond to a USB device. In the following description of the disclosure, a consumer or sink may be referred to as the peripheral electronic device 200a, 200b, or 200c.

The source and sink of the disclosure may support power role swap. The power role swap may refer to a procedure of exchanging the roles of a source and a sink between port partners. A port capable of playing both roles of a source and a sink may be referred to as a dual-role port. On the other hand, a port capable of playing only one of the roles of a source and a sink may be referred to as a single-role port.

In various embodiments described herein, a source, a provider, or a DFP may be the electronic device 100, an electronic device 101, the connection device 300, an electronic device 400, an electronic device 500, an electronic device 900, an electronic device 901, or an electronic device 1001. In various embodiments described herein, a sink, a consumer, or a UFP may be the peripheral electronic device 200a, 200b, or 200c, or a peripheral electronic device 201.

A configuration of an interface which is applicable to various embodiments based on the interface 21 will be described below.

FIG. 2 is a block diagram illustrating a configuration of an interface that is applicable to one embodiment of the disclosure.

The interface 21, which may be applied to one embodiment of the disclosure, may be, for example, a Type-C interface supporting USB Type-C. Although the following description is given based on a Type-C interface, various interfaces may be applied to embodiments described in the disclosure.

Referring to FIG. 2, the interface 21 may include a plurality of (e.g., 24 each) pins or terminals that play different roles. The interface 21 may include four ground pins (GND), four cable bus power pins for supplying power (VBUS), pins for supporting the USB 2.0 protocol (D+ and D−), four pairs of data bus pins for providing high-speed data paths (TX1+, TX1−, TX2+, TX2−, RX1+, RX1−, RX2+, and RX2−), two sideband-use pins (SBU1 and SBU2), and two CC pins for detecting a cable (CC1 and CC2).

A receptacle (e.g., 21) may use the two CC pins (CC1 and CC2), but a plug (e.g., 22) may use only one CC pin. The remaining pins of the plug 22, which are not used, may be repurposed as VCONN. When one of the CC pins CC1 and CC2 of the receptacle 21 is used as a CC pin, the other CC pin may be repurposed as VCONN. A pin of the receptacle 21 connected to a pin used as a CC pin of the plug 22 may be used as the CC pin. A pin of the receptacle 21 connected to the pins used as the remaining pins of the plug 22 may be adjusted to play the role of VCONN.

The CC pin may be used to detect the attachment and detachment between the DFP or the UFP. The CC pin may be used to detect the role of a host and device or the role of a source and sink.

A method of recognizing the connection with the peripheral electronic device 200a based on an interface supporting USB type-C in the electronic device 100 will be described below.

The electronic device 100 may determine whether it is connected to the peripheral electronic device 200a using a CC pin. The CC pin of the receptacle may include a CC1 pin and a CC2 pin. When the CC pin of the plug and the CC1 pin of the receptacle are connected, the electronic device 100 may perform pull-up operation using the pull-up resistor Rp connected to the CC1 pin. The pull-up resistor may be replaced with a current source. The electronic device 100 may monitor the pull-up resistor or the CC pin to detect the peripheral electronic device 200a. A resistance of the pull-up resistor may correspond to a level of an initial current that may be provided by the electronic device 100.

The electronic device 100 may determine which CC pin has the VCONN purpose using the pull-down characteristic of the CC pin. When the peripheral electronic device 200a is detected, the electronic device 100 may enable VBUS and VCONN. The electronic device 100 may dynamically adjust the pull-up resistor and inform the peripheral electronic device 200a of a change in a USB type-C current that may be supplied.

The electronic device 100 may monitor the pull-down resistor Rd to detect which the peripheral electronic device 200a is disconnected. When the disconnection of the peripheral electronic device 200a is detected, the electronic device 100 may remove VBUS and VCONN. The electronic device 100 may again monitor whether the peripheral electronic device 200a is detected. When the electronic device 100 supports a PD function, an additional operation of PD according to description with reference to FIG. 3 below may be performed.

On the other hand, the peripheral electronic device 200a may operate as follows. The peripheral electronic device 200a may connect the CC1 pin and the CC2 pin to the ground (GND) using the pull-down resistor Rd. The peripheral electronic device 200a may determine whether it is connected to the electronic device 100 using VBUS.

The peripheral electronic device 200a may detect the USB type-C current that may be supplied from the electronic device 100. The peripheral electronic device 200a may manage a load within a current constraint detected from the electronic device 100. When the peripheral electronic device 200a supports the PD function, the peripheral electronic device 200a may perform an additional operation of PD.

The current flowing to the CC pin may be varied depending on the current that the electronic device 100 may supply to the peripheral electronic device 200a. The peripheral electronic device 200a may identify the amount of current that may be supplied from the electronic device 100 in accordance with the CC pin voltage. The peripheral electronic device 200a may identify the amount of current that may be supplied from the electronic device 100 using the pull-down resistor Rd.

Table 1 shows values that may be used as the pull-up resistor or current source of a source port according to USB 3.1 specification release 1.2. However, when the voltage is equal to or less than 5.5 V and is within the correct voltage range of the sync port, other pull-up voltages may be allowed.

TABLE 1

| Source advertisement | Current Source to 1.7-5.5 V | Resistor pull-up to 4.75-5.5 V | Resistor pull-up to 3.3 V ± 5% |
|---|---|---|---|
| Default USB power | 80 µA ± 20% | 56 kΩ ± 20% | 36 kΩ ± 20% |
| 1.5 A@ 5 V | 180 µA ± 8% | 22 kΩ ± 5% | 12 kΩ ± 5% |
| 3.0 A@ 5 V | 330 µA ± 8% | 10 kΩ ± 5% | 4.7 kΩ ± 5% |

The USB Type-C may typically use a voltage of 5V, and the Type-C may support an operation mode of which the maximum current is 1.5 A or an operation mode of which the maximum current is 3.0 A. In the case of Type-C supporting PD, a power supply of 20V/5 A may be used.

The DFP of the electronic device 100 may have a pull-up resistor and the UFP of the peripheral electronic device 200a may have a pull-down resistor. The pull-down resistor Rd, may be fixed to 5.1 kΩ as shown in Table 2 below. Table 2 below shows Rd requirements of the sink port.

TABLE 2

| Rd implementation | Nominal value | Can detect power capability | Max voltage on pin |
|---|---|---|---|
| ±20% voltage clamp | 1.1 V | No | 1.32 V |
| ±20% resistor to GND | 5.1 kQ | No | 2.18 V |
| ±10% resistor to GND | 5.1 kQ | Yes | 2.04 V |

'Norminal value' represents a resistance required for performance of a corresponding Rd. 'Max voltage on pin' represents the maximum voltage value when considering a change (e.g., ±20%). In the case of 'voltage clamp', the performance of PD is prohibited. The disclosure will be described based on the fact that the pull-down resistor has a resistance of 5.1 kΩ.

The peripheral electronic device 200a may know the type of the electronic device 100 using the pull-down resistor. The electronic device 100 may inform the peripheral electronic device 200a which current mode is the voltage value that is to be supported on the CC pin by the electronic device 100.

Table 3 shows CC voltage values that may be used to detect a type of a device connected based on USB-Type-C current advertisement by the peripheral electronic device 200a. Table 3 shows the CC voltage values detected through the pull-down resistor of a sync port for the peripheral electronic device 200a.

TABLE 3

| Detection | Min voltage | Max voltage | Threshold |
|---|---|---|---|
| vRa | −0.25 V | 0.15 V | 0.2 V |
| vRd-connect | 0.25 V | 2.04 V | |
| vRd-USB | 0.25 V | 0.61 V | 0.66 V |
| vRd-1.5 | 0.70 V | 1.16 V | 1.23 V |
| vRd-3.0 | 1.31 V | 2.04 V | |

The UFP of the peripheral electronic device 200a may know a voltage which the VBUS of the DFP may supply based on a voltage across the CC pin. For example, when the DFP of the electronic device 100 is designed to have 5V/1.5 A, the DFP of the electronic device 100 may correspond to a current of 180 μA flowing through the CC pin. The peripheral electronic device 200a may determine that the voltage across the pull-down resistor is 0.918 V (180 μA*5.1 kΩ=0.918 V). The 0.918 V is greater than the threshold 0.66 V and less than the threshold 1.23 V in Table 3, and therefore, the peripheral electronic device 200a may determine that the electronic device 100 is a device capable of supplying 1.5 A (vRd–1.5).

Alternatively, when a pull-up resistor of 22 kΩ is used for VBUS, a voltage at the CC pin may correspond to approximately 0.94V (5 V*5.1/(5.1+22)). Accordingly, even in this case, it may be determined that the electronic device 100 may supply 1.5 A in the UFP of the peripheral electronic device 200a. Hereinafter, pins included in the interface may be referred to as terminals. For example, a VBUS pin may be a VBUS terminal. The CC pin may be a CC terminal.

The electronic device 100, the peripheral electronic device 200a, and the connection device 300 according to an embodiment may support the USB PD protocol or include an interface supporting the USB PD protocol. The electronic device 100 supporting the USB PD protocol may perform PD communication through a configuration channel CC and exchange power information between connected electronic devices. The electronic device 100 may exchange power information through the configuration channel CC based on a bi-phase mark code (BMC). The electronic device 100 may deliver power based on the exchange of the power information. When the electronic device 100 enters the DFP mode, power may be delivered to another electronic device 200a, connected via a USB cable, through a battery or a DC adapter.

Figure 3:
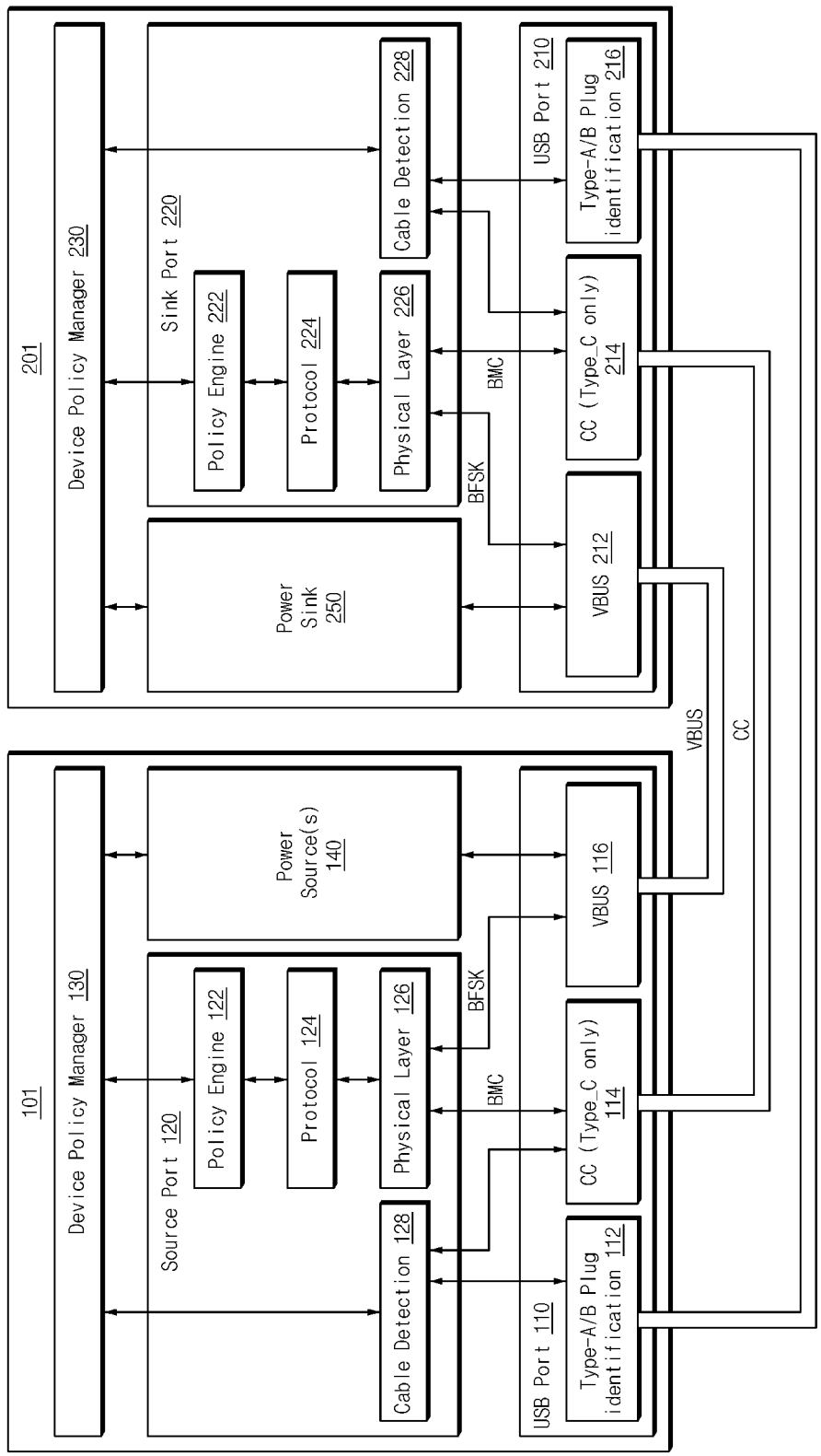
FIG. 3 is an architectural block diagram of an interface according to an embodiment.

FIG. 3 illustrates a logical architecture of a power delivery protocol (PD protocol) according to one embodiment.

Referring to FIG. 3, the electronic device 101 serving as a provider may include a USB port block 110, a source port block 120, a device policy manager block 130 and/or a power source block(s) 140.

Referring to FIG. 3, the peripheral electronic device 201 serving as a consumer may include a USB port block 210, a sink port block 220, a device policy manager block 230, and a power sink block(s) 250.

The USB port blocks 110 and 210 may be used to recognize a type of a connected plug and to exchange a message or deliver power. The USB port blocks 110 and 210 may include type-A/B plug identification pins 112 and 222, CC pins 114 and 224, and/or VBUS pins 116 and 216.

The source port blocks or sink port blocks 120 and 220 may include policy engine blocks 122 and 222, protocol layers 124 and 224, physical layers 126 and 226, and/or cable detection blocks 128 and 228, respectively.

The policy engine block 122 or 222 may execute a local policy for a port. The policy engine block 122 or 222 may interact directly with the device policy manager 130 or 230 to determine a current local policy.

The protocol layers 124 and 224 may generate or enable messages exchanged between the source port block 120 and the sink port block 220. The protocol layers 124 and 224 may form a capability message, a request message, and a response message. The protocol layers 124 and 224 may also generate messages used for role swap or maintenance of a current state. The protocol layers 124 and 224 may receive message-related indications from policy engine blocks 122 and 222.

The physical layers 126 and 226 may process the transmission and reception of bits on wires and the transmission of data. The physical layers 126 and 226 may transmit and receive messages over the VBUS or CC wires. The physical layers 126 and 226 may support a binary frequency shift keying (BFSK) signaling scheme on VBUS and may support a BMC signaling scheme on a CC. The physical layers 126 and 226 may manage data on wires, avoid a collision or perform recovery from a collision, and detect an error of a message using the cyclic redundancy check (CRC).

The cable detection blocks 128 and 228 may detect the presence or absence of VBUS for the sync port. The cable detection blocks 128 and 228 may identify whether a cable (e.g., 10) supporting PD is connected thereto. Information generated by the cable detection blocks 128 and 228 may be provided to the device policy manager block 130. The PD protocol standard may define a USB type-C connector for detection of a USB supporting PD.

The device policy manager blocks 130 and 230 may manage USB PD resources in each device based on the device's local policy. The device policy manager blocks 130 and 230 may provide and update information related to PD through interaction with the interface. The device policy manager blocks 130 and 230 may interact with the source port block 120 or the sink port block 220 to manage resources. When a change in the local policy occurs, the device policy manager block 130 or 230 may inform the policy engine 122 or 222 of the source port block 120 or the sink port block 220 of the change. The device policy manager block 130 of the electronic device 101 may manage each source port block 120 and know a negotiated power. The device policy manager block 230 of the peripheral electronic device 201 may manage each sink port block 220 and know a negotiated power. The device policy manager block 130 or 230 may use the cable policy block 128 or 228 to identify cable connections. The device policy manager block 130 or 230 may report the source capability that may be supported by the electronic device 101 or may report power requirements by the peripheral electronic device 201. The device policy manager block 130 may evaluate and respond to a request of the peripheral electronic device 201. The device policy manager block 230 may evaluate the source capability and transmit appropriate responses thereto (e.g., a request for a proposed capability, an indication that additional power is needed, or the like). A local policy may be enacted by communication between the policy engine block 122 or 222 and the cable detection block 128 or 228.

The power source block 140 may be controlled by the local policy. The power source block 140 may be driven according to a specific event on the VBUS. When vSafe0V is detected, the power source block 140 may detect a connection event and transition the output (out) to vSafe5V. The power sink block 250 may be driven at a defined current level and a specified voltage.

The cable detection and power negotiation according to the USB PD protocol will be described below in more detail. According to the USB PD protocol, the electronic device 101 may determine which device is a host or a device. The electronic device 101 may determine which device corresponds to a source port or provider and which device corresponds to a sink port or consumer.

The electronic device 101 may perform cable recognition. A cable recognition process may be performed as follows. The electronic device 101 may perform cable recognition when a power of the source port increases or there is role swap.

The electronic device 101 may determine a type of a cable connected and limit a capability to be suggested based on a receptacle type and known current delivery capability. The electronic device 101 may determine a cable type based on the CC pin in case of the type-C connector.

The electronic device 101 may perform a negotiation process for supply of power. For supply of power through PD, the electronic device 101 may transition to three states. The three states may be a cable connection state, a PD connection state, and a PD contract state. In a connection state where a PD connection or contract has not been performed, the electronic device 101 may detect the connection of the peripheral electronic device 201 through a plug (e.g., a type-C plug). The electronic device 101 may recognize that the corresponding device 101 is a source port and may set VBUS to vSafe5V.

Prior to transmission of a capability message for negotiation for supply of power, the electronic device 101 may detect a type of a connected cable and change an advertise capability based on the detected type of the cable. For example, a default capability for a C-plug is 3 A. It is noted that the electronic device 100 may determine other capabilities of the cable using a cable communication protocol (e.g., SOP).

The formation of PD connection may be performed when a response message (e.g., a GoodCRC message) is received in response to the capability message transmitted from the peripheral electronic device 201 or a hard reset signaling is received.

The electronic device 101 may receive a request message from the peripheral electronic device 201 and may transmit an accept message when the request message is a valid request. The electronic device 101 may transmit a ready message (e.g., a PS_RDY message) when being ready to supply power of an accepted level. In this case, a contract between the electronic device 101 and the peripheral electronic device 201 may be established.

The peripheral electronic device 201 may identify capability information, select a power supply level to be used by the device 201 and transmit a request message to the electronic device 101.

The electronic device 101 may identify the received request message and transmit, to the peripheral electronic device 201, an accept message indicating that the electronic device 101 accepts it. The electronic device 101 may switch a current state to the power supply level required by the peripheral electronic device 201. A 'PS_RDY' message may be transmitted to the peripheral electronic device 201. The peripheral electronic device 201 receiving the 'PS_RDY' message may use the new power supply level.

Negotiation for power supply may be performed even after hard reset. The reset may include a soft reset procedure and a hard reset procedure. A hard reset command may initialize an operation state of the USB PD. The dual-role port may switch roles through the hard reset and may switch supply and consumption states of a default power, a current, or the like. Such a reset may be requested by the electronic device 101 or may be requested by the peripheral electronic device 201.

The USB PD may also be performed even in a device that supports the USB 2.0 standard. The USB 2.0 standard specifies that a VBUS pin is capable of being used to transmit PD-related data.

Although device recognition operations applicable to various embodiments have been described above based on the USB Type-C standard and the PD protocol standard, interface-related standards may be applied to interface-related operations described in the disclosure.

Figure 4:
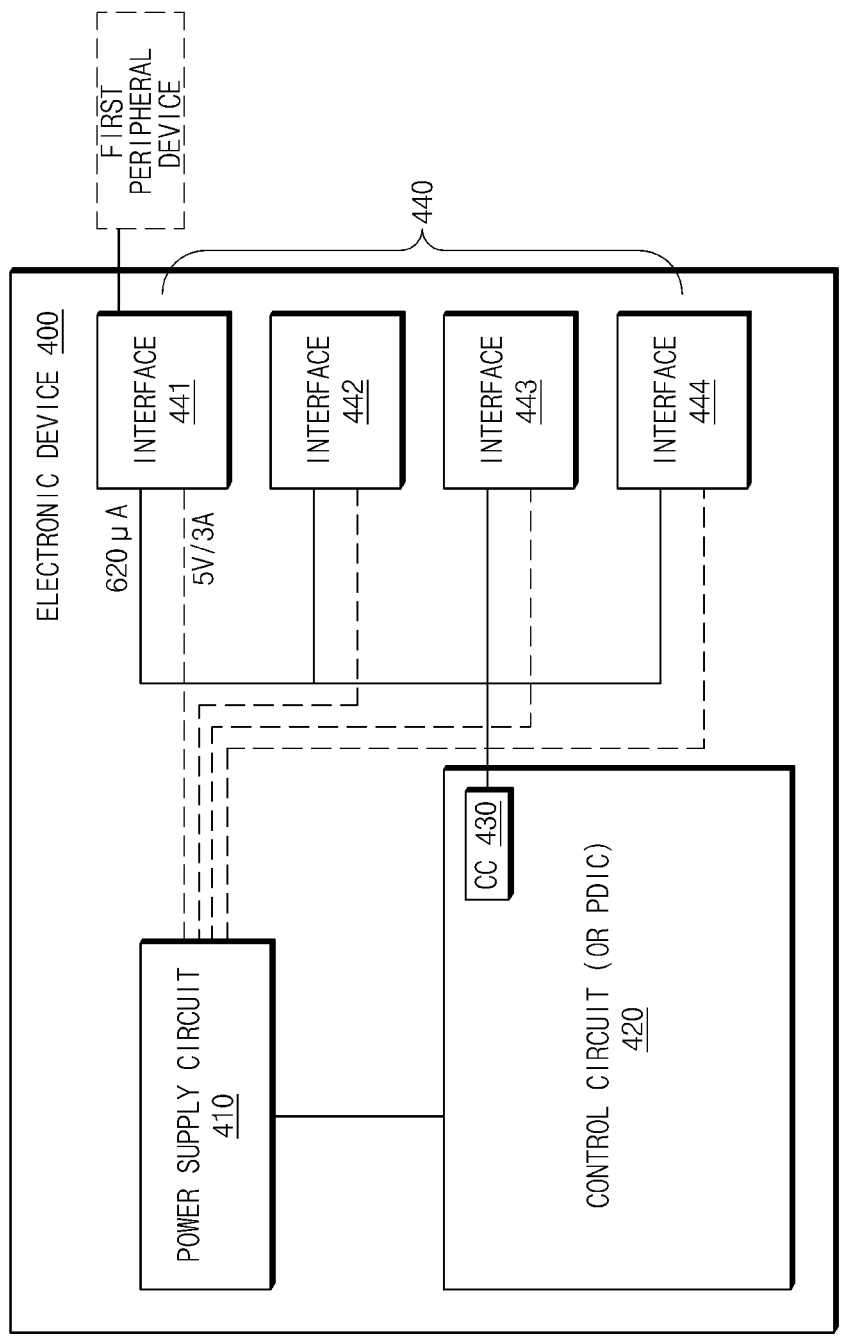
FIG. 4 is a block diagram illustrating a configuration of an electronic device according to an embodiment.

FIG. 4 is a block diagram illustrating a configuration of an electronic device according to an embodiment; Referring to FIG. 4, the electronic device 400 may include a power supply circuit 410, a control circuit 420 including a CC pin, and a plurality of interfaces 440.

The electronic device 400 may recognize at least one peripheral electronic device (e.g., a first peripheral electronic device) connected via a cable to the plurality of interfaces 440, and may be connected to the device through a cable. The control circuit 420 included in the electronic device 400 may be connected to the plurality of interfaces 440 through a single pin 430.

The power supply circuit 410 may supply power to peripheral electronic devices via the interfaces 441, 442, 443, and 444 respectively. The power supply circuit 410 may supply a current to the peripheral electronic devices. The power supply circuit 410 may supply a voltage to the peripheral electronic devices. In one embodiment, the power supply circuit 410 may be connected to the peripheral electronic devices via a VBUS or V-BUS line. The power supply circuit 410 may supply power to the peripheral electronic device via the VBUS or V-BUS lines. The power supply circuit 410 may include an adapter that converts AC power to DC power. The power supply circuit 410 may include a battery or may be connected to a separate battery. The power supply circuit 410 may be connected to the control circuit 420 through a bus. The power supply circuit 410 may be under the control of the control circuit 420.

The control circuit 420 may determine the maximum power and/or the maximum current that may be supplied to the peripheral electronic device (e.g., the first peripheral electronic device). The control circuit 420 may determine whether the peripheral electronic device is connected thereto.

The control circuit 420 may include a terminal that may be connected to at least one external device. The control circuit 420 may include a pin capable of obtaining information about an external device or performing communication with the external device. In one embodiment, the control circuit 420 may include a CC pin 430. The control circuit 420 may determine through the CC pin 430 whether a peripheral electronic device is connected thereto. The CC pin 430 may be a CC pin used in USB type-C. The CC pin 430 may detect the connection of the peripheral electronic device. The CC pin 430 may be connected to an interface via a bus. In one embodiment, the bus may be a CC wire.

The plurality of interfaces 440 may be connected to the CC pin 430 of the control circuit 420. The number of the plurality of interfaces may be two or more. Although the four interfaces 441, 442, 443, and 444 are illustrated as being included in FIGS. 4 to 8, this is for the purpose of describing various embodiments, and the electronic device 400 may include more or fewer interfaces. At least one of the plurality of interfaces 440 may include a CC pin. At least one of the plurality of interfaces 440 may include CC pins CC1 and CC2. Each interface or CC pin may be connected to a pull-up resistor. Each interface or CC pin may be connected to a pull-down resistor. At least one of the plurality of interfaces 440 may be a receptacle that may be connected to at least one cable or a plug of a connection device.

The control circuit 420 may be a controller. In one embodiment, the control circuit may be a controller (PDIC) that controls power delivery. The PDIC may be a component, a controller, or an internal block that performs CC communication for performing type-C operation.

The operation of the electronic device 400 as the number of peripheral electronic devices connected to the electronic device 400 increases will be described below with reference to FIGS. 4 and 5.

Figure 5:
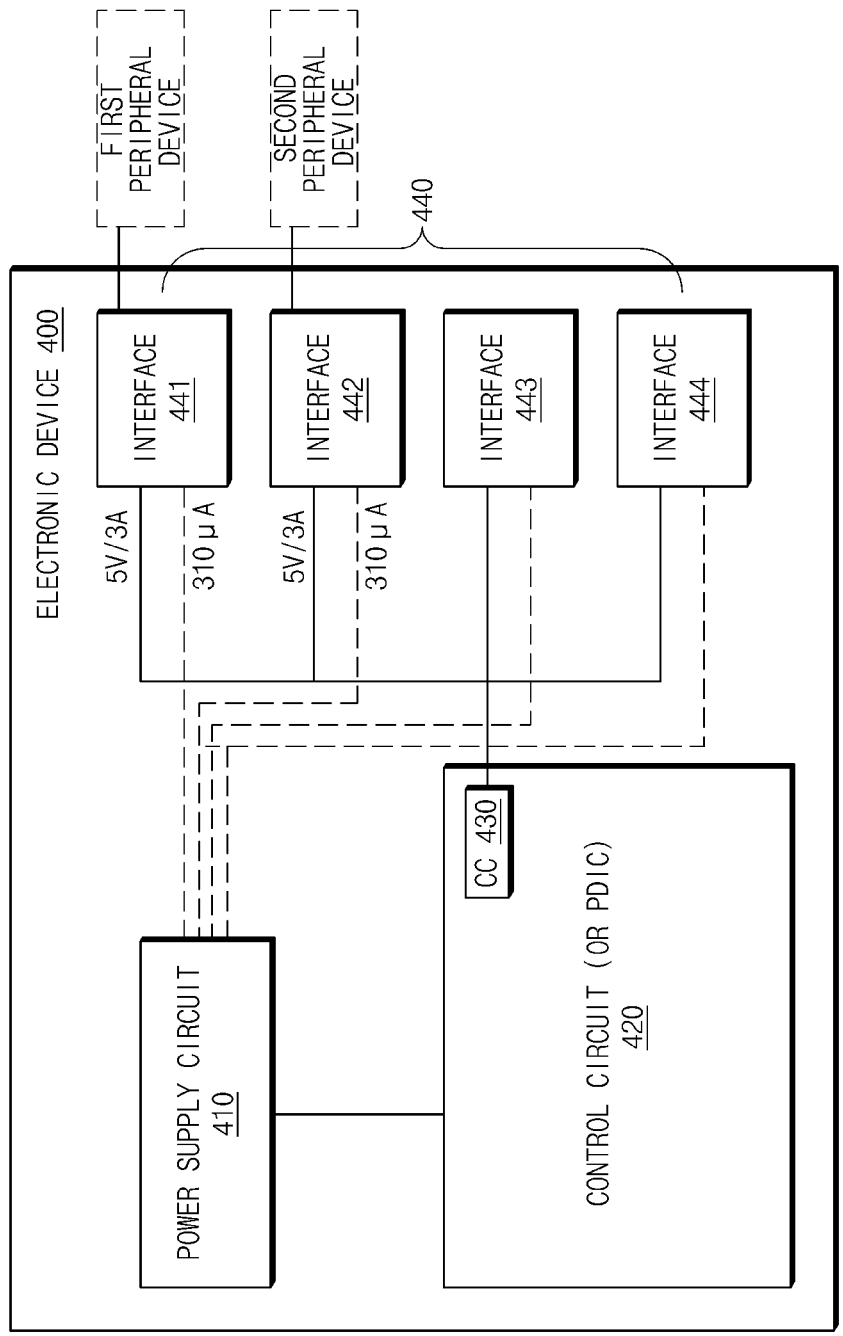
FIG. 5 is a diagram for describing an operation of the electronic device according to an embodiment.

In FIGS. 4 and 5, a peripheral electronic device connected to the interface 441 may be a first peripheral electronic device, and a peripheral electronic device connected to the interface 442 may be a second peripheral electronic device. A peripheral electronic device connected to the interface 443 may be a third peripheral electronic device and a peripheral electronic device connected to the interface 444 may be a fourth peripheral electronic device.

When the plurality of peripheral electronic devices are connected to the electronic device 400 of FIGS. 4 and 5, by causing the interfaces 441, 442, 443, and 444 to be short-circuited, a CC pin voltage on each interface side may be lowered due to internal resistors of the peripheral electronic devices. More specifically, the internal resistors of the peripheral electronic devices may be connected in parallel to one another. Therefore, the total resistance may be reduced due to a combined resistance of the resistors connected in parallel. As a result, each CC pin voltage may be lowered.

It is assumed that each peripheral electronic device has a pull-down resistor Rd of 5.1 kΩ, and a total current that may be supplied by the electronic device 400 operating as a source port is 6 A. It is also assumed that a current that may act from the source port to a CC pin is 620 μA.

Referring to FIG. 4, operation of the electronic device 400 will be described when one peripheral electronic device (e.g., the first peripheral electronic device) is connected.

When the first peripheral electronic device is connected to the electronic device 400, the electronic device 400 may allow a current of 620 μA to flow through the CC pin 430. In this case, the voltage of the CC pin is 2.65V because a pull-down resistance of the first peripheral electronic device is 5.1 kΩ.

The first peripheral electronic device may determine a charging current of the electronic device 100 based on the pull-down resistance. The first peripheral electronic device may recognize the electronic device 100 as a device capable of supplying a charging current of 3 A based on Table 3.

Referring to FIG. 5, when the second peripheral electronic device is connected to the electronic device 400 via the interface 442 in a state where the first peripheral electronic device is connected to the electronic device 400, the electronic device 400 may similarly cause a current of 620 μA to flow through the CC pin 430. A current of 310 μA may be supplied to the CC pins of the input and output interfaces 441 and 442. A total resistance viewed from the CC pin 430 with respect to the first peripheral electronic device and the second peripheral electronic device may be 2.55 kΩ due to the parallel connection, and therefore, the CC pin voltage across the CC pin may be 1.58V. Similarly, referring to Table 4, the electronic device 100 may be recognized as a device capable of supplying a charging current of 3 A.

In one embodiment, the connected first peripheral electronic device or second peripheral electronic device may inform the electronic device 400 of a current desired to be supplied. When the first peripheral electronic device or the second peripheral electronic device requests a current of 3 A, the electronic device 400 may supply a charging current of 3 A according to the capability of the electronic device 400. The electronic device 400 may supply the current of 3 A to the peripheral electronic devices.

Although the third peripheral electronic device and the fourth peripheral electronic device are not illustrated as being connected in FIGS. 4 to 5, similar operation to the case in which the second peripheral electronic device is connected may be performed even when the third peripheral electronic device and the fourth peripheral electronic device are connected. Operation in a case where more devices are connected will be described with reference to Table 4 below.

TABLE 4

| Number of connected peripheral electronic devices | CC pin resistance (parallel) | CC pin voltage (by 620 μA CC current) | Charging current for each peripheral electronic device |
|---|---|---|---|
| 1 | 5.1 kΩ | 2.65 V | 3 A |
| 2 | 2.55 kΩ | 1.58 V | 3 A |
| 3 | 1.7 kΩ | 1.05 V | 1.5 A |
| 4 | 1.275 kΩ | 0.79 V | 1.5 A |
| 5 | 1.02 kΩ | 0.63 V | 0.5 A |
| 6 | 0.85 kΩ | 0.52 V | 0.5 A |

When the third peripheral electronic device is connected to the electronic device 400 in a state where the first peripheral electronic device and the second peripheral electronic device are connected, the electronic device 400 may be recognized as a device capable of supplying a charging current of 1.5 A.

In the state where the first peripheral electronic device and the second peripheral electronic device are connected, when the fourth peripheral electronic device is connected to the electronic device 400, the parallel combined value of the resistors is 1.2767 kΩ. Likewise, the electronic device 400 may be recognized as a device capable of supplying a charging current of 1.5 A.

It is also possible that the number of peripheral electronic devices is increased to five or six. In this case, the electronic device 400 may be recognized as a device that supplies a smaller amount of charging current.

In one embodiment, once the peripheral electronic device is connected, the electronic device 400 may perform a procedure for determining a supply power. The electronic device 400 may supply power at the request of the peripheral electronic device. When a peripheral electronic device (e.g., a second peripheral electronic device) is further connected in a state where at least one peripheral electronic device (e.g., a first peripheral electronic device) is connected, the electronic device 400 may initialize the procedure for determining the supply power. The electronic device 400 may initialize settings according to the procedure for determining the supply power. The electronic device 400 may again perform the procedure for determining the supply power.

In the disclosure, it is assumed that a current flowing through the CC pin 430 is 620 μA, but this is merely an example for facilitating understanding of the disclosure. The current flowing through the CC pin 430 may be compatible with a relevant standard document or various values may be applied.

According to the embodiment of FIGS. 4 and 5, the CC pins of the connected ports are all short-circuited, and, in a case where the electronic device 100 changes the charging current according to the maximum current that may be supplied, the voltage of the CC pin 430 may be reduced every time whenever a peripheral electronic device is connected thereto. Therefore, depending on the number of connected peripheral electronic devices, the amounts of maximum charging current that may be recognized by the peripheral electronic devices may have different values.

In addition, according to the embodiments of FIGS. 4 and 5, a total resistance varies depending on the number of connected peripheral electronic devices and therefore, the electronic device 400 may supply sufficient current in a range of power capability.

Even when four peripheral electronic devices are connected, supply power may be 5V*1.5 A*4=30 W. In this case, it is possible to supply sufficient charging current to peripheral electronic devices using a device of Profile 3 (36 W) of the USB standard. For reference, the current USB PD standard is divided into standard profile 1 of 10 W, standard profile 2 of 18 W, standard profile 3 of 36 W, standard profile 4 of 60 W, and standard profile 5 of 100 W as well as profile 0.

Figure 6:
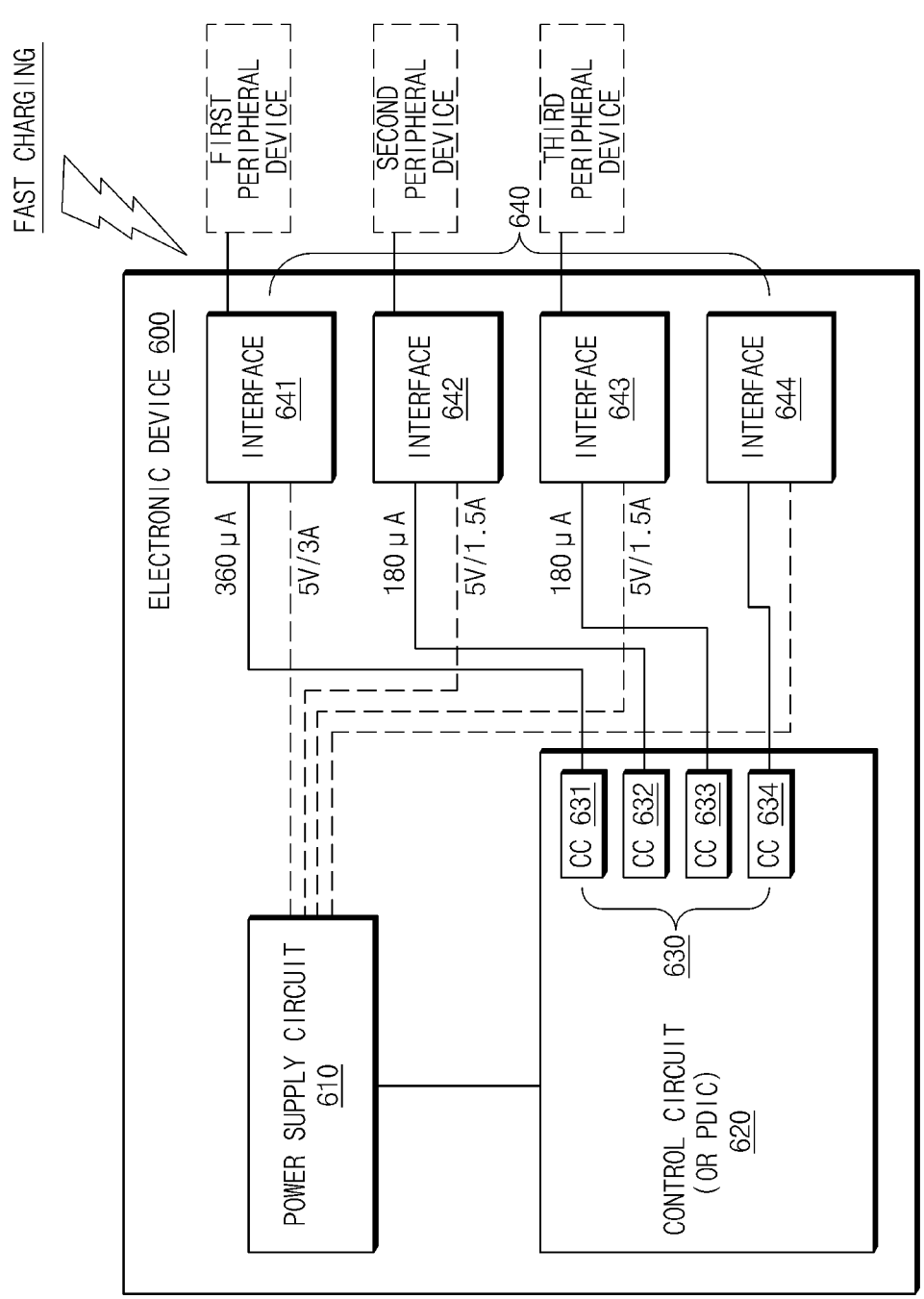
FIG. 6 is a block diagram illustrating a configuration of an electronic device according to another embodiment.

FIG. 6 is a block diagram illustrating a configuration of an electronic device according to another embodiment;

Referring to FIG. 6, an electronic device 600 may include a power supply circuit 610, a control circuit 620 including a plurality of CC pins, and a plurality of interfaces 640.

The electronic device 600 may recognize at least one peripheral electronic device (e.g., a first peripheral electronic device) that is wired to the plurality of interfaces 640, and may be connected to the device through a cable. The control circuit 620 included in the electronic device 600 may be connected to the plurality of interfaces 640 through a plurality of pins 630 provided in the control circuit 620. The electronic device 600 may be respectively connected to the interfaces 641, 642, 643, and 644 via the pins 631, 632, 633, and 634 to control peripheral electronic devices.

The power supply circuit 610 may supply power to the peripheral electronic devices via the interfaces 641, 642, 643, and 644 respectively. The power supply circuit 610 may supply a current to the peripheral electronic devices. The power supply circuit 610 may supply a voltage to the peripheral electronic devices. The power supply circuit 610 may be connected to the peripheral electronic devices via power supply terminals of the interfaces 641, 642, 643, and 644. In one embodiment, the power supply circuit 610 may be connected to the peripheral electronic devices via a VBUS or V-BUS line. The power supply circuit 610 may supply a power to the peripheral electronic devices via the VBUS or V-BUS line. The power supply circuit 610 may include an adapter that converts an AC power to a DC power. The power supply circuit 610 may include a battery. Although not shown in FIG. 6, the power supply circuit 610 may be connected to the control circuit 620 through a bus. The power supply circuit 610 may be under the control of the control circuit 620.

The control circuit 620 may determine a maximum power and/or a maximum current that may be supplied to the peripheral electronic device (e.g., the first peripheral electronic device). The control circuit 620 may determine whether the peripheral electronic device is connected thereto. The control circuit 620 may change settings of each pin 630 for each interface 640 using a separate algorithm. Therefore, the control circuit 620 may freely control a charging speed for each of the interfaces 640.

The control circuit 620 may include a pin that may be coupled to one external device through each of the interfaces 641, 642, 643, and 644. The control circuit 620 may include the plurality of pins 630. The control circuit 620 may determine whether peripheral electronic devices are respectively connected through the pins 631, 632, 633, and 634. The pins may be respectively connected to terminals of the interfaces 641, 642, 643, and 644. The pins may be electrically connected to a power supply terminal (e.g., VBUS) or a terminal (e.g., CC) for obtaining information about a connected external device or communicating with a connected external device. The control circuit 620 may deliver the BMC to the peripheral electronic devices via wires respectively connecting the pins 631, 632, 633, and 634 and cables. The control circuit 620 may receive signals or messages from the peripheral electronic devices using BMC communication.

One pin (e.g., 631) may be a pin for obtaining information about a connected external device or for communicating with a connected external device. The one pin 631 may be a CC pin used in USB type-C. The one pin 631 may detect the connection of one peripheral electronic device. The one CC pin 631 may be connected to one interface (e.g., 641) via a wire. The one CC pin 631 may be connected to the interface 641 via one CC wire. The one CC pin 631 may use one CC channel. The plurality of CC pins 630 may use a plurality of CC channels.

The plurality of interfaces 640 may be coupled to the CC pins 630 of the control circuit. Each interface (e.g., 641) may be coupled to one CC pin (e.g., 631). The number of the plurality of interfaces may be two or more. Although four interfaces 641, 642, 643, and 644 are illustrated as being included in FIGS. 6 to 8, this is for the purpose of describing embodiments described in the disclosure, and the electronic device 600 may include more interfaces. At least one of the plurality of interfaces 640 may include a CC terminal. At least one of the plurality of interfaces 640 may include CC terminals CC1 and CC2. Each interface or CC terminal may be connected to a pull-up resistor. Each interface or CC terminal may be connected to a pull-down resistor. At least one of the plurality of interfaces 640 may be a receptacle that may be connected to a cable or a plug of a connection device.

The control circuit may be a controller. In one embodiment, the control circuit may be a controller (PDIC) that controls power delivery. The PDIC may be a component, a controller, or an internal block that performs CC communication for performing type-C operation.

Figure 7:
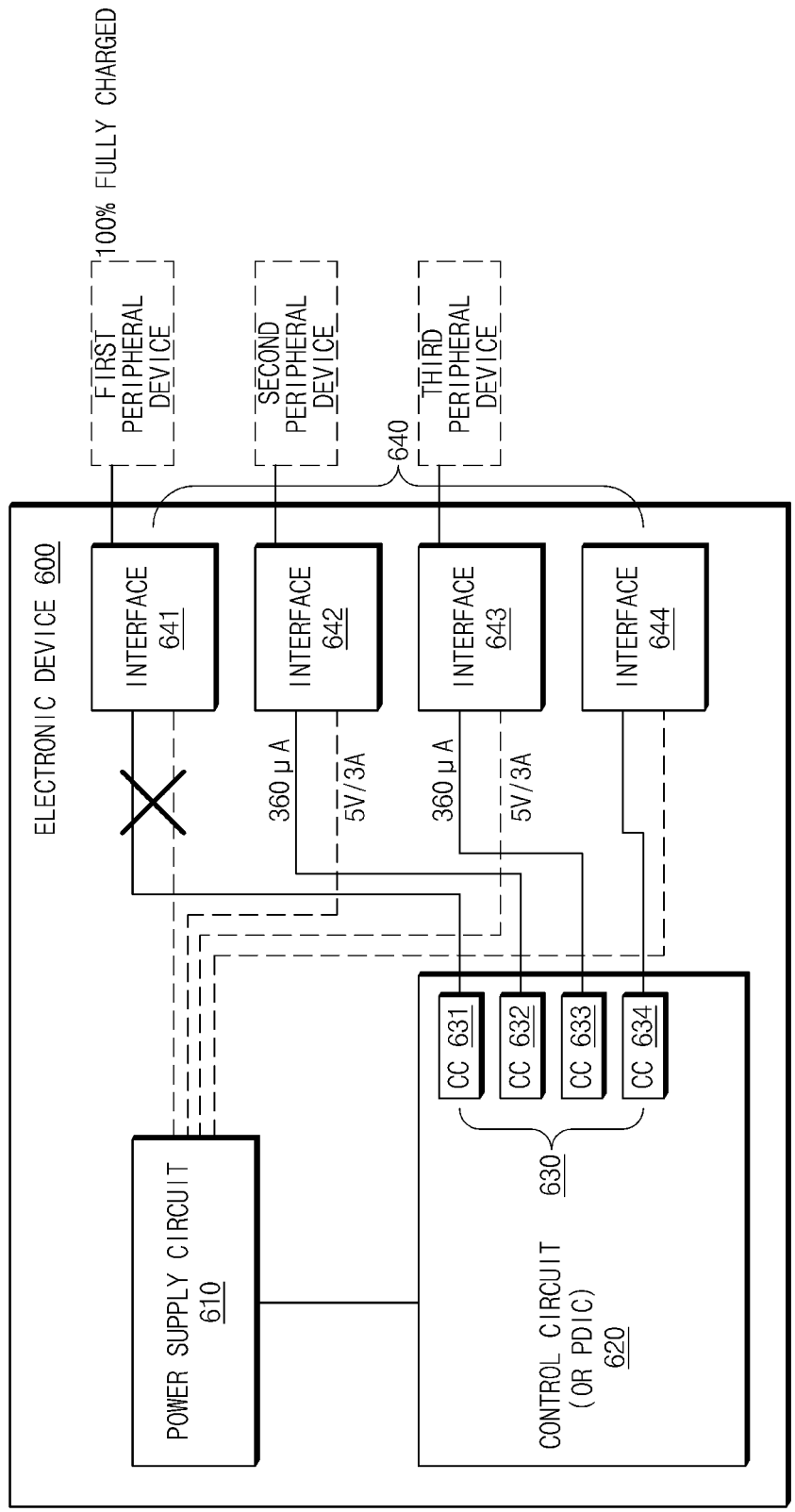
FIG. 7 is a diagram for describing an example of an operation of the electronic device according to another embodiment.
Figure 8:
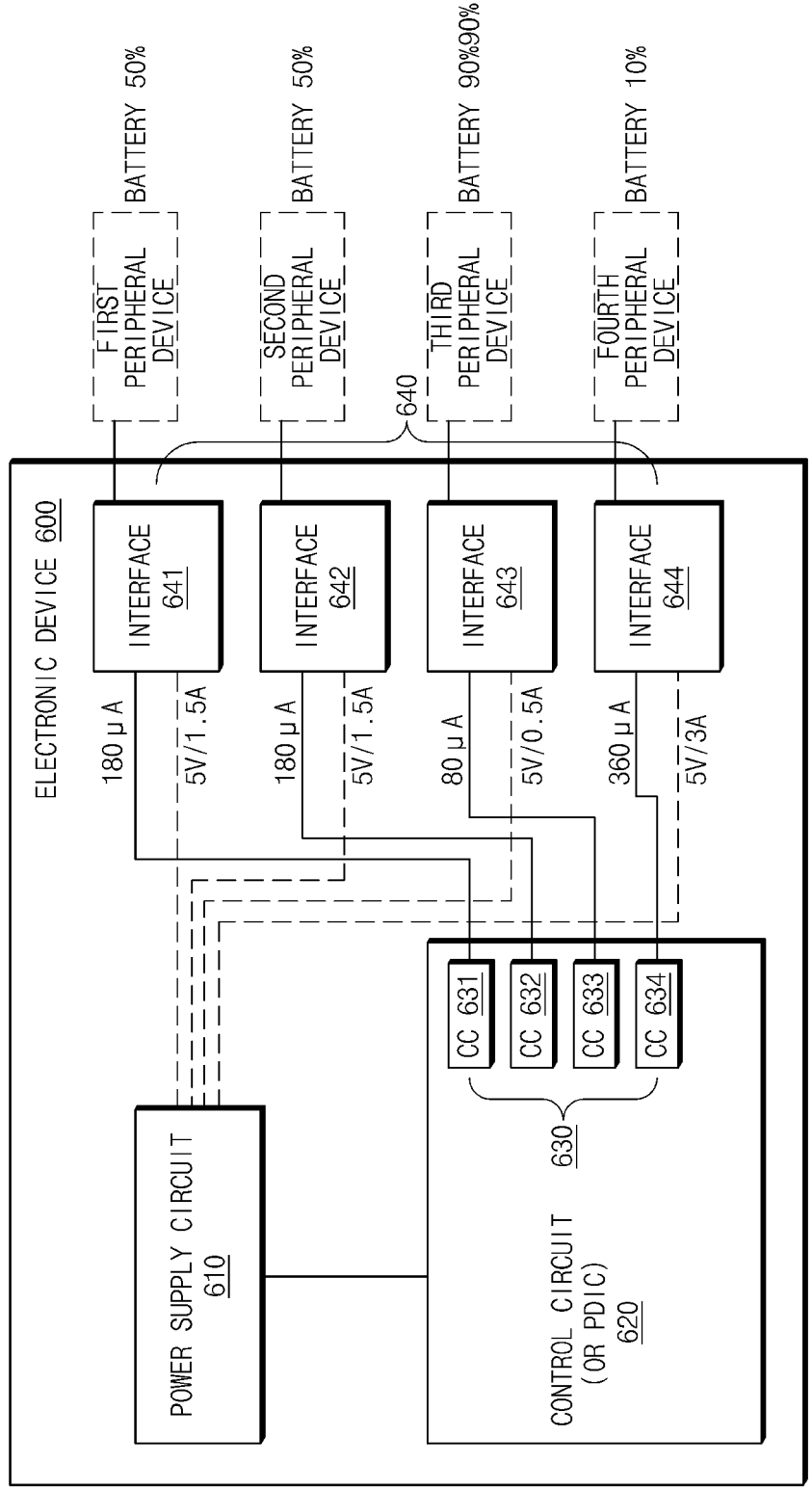
FIG. 8 is a diagram for explaining another example of the operation of the electronic device according to another embodiment.

In FIGS. 6 to 8, a peripheral electronic device connected to the interface 641 may be a first peripheral electronic device, a peripheral electronic device connected to the interface 642 may be a second peripheral electronic device, a peripheral electronic device connected to the interface 643 may be a third peripheral electronic device, and a peripheral electronic device connected to the interface 644 may be a fourth peripheral electronic device.

Referring to FIG. 6, operation of the electronic device 600 including a control circuit with a plurality of CC pins will be described.

The electronic device 600 may support a plurality of CC channels according to the plurality of CC pins 630. Each of the CC channels may be independently connected to each of the interfaces 641, 642, 643, and 644.

The electronic device 600 may monitor the number of connected peripheral electronic devices through operation of detecting the plurality of CC pins 630. In FIG. 6, the electronic device 600 may identify that three peripheral electronic devices are connected thereto. The electronic device 600 may control a charging current based on the number of connected peripheral electronic devices.

The electronic device 600 may change settings of the CC pin 630 for each of the interfaces 640. The electronic device 600 may control a charging speed for each charging port. To control the charging speed, the electronic device 600 may change the amount of current flowing through each charging port.

The electronic device 600 may change a current flowing through the CC pin 630 according to the number of connected peripheral electronic devices. When the amount of current flowing through the CC pin 630 is changed, the amount of current flowing through a resistor of 5.1 kΩ is changed in the peripheral electronic device. Therefore, a voltage of the CC pin 630 may be changed. The electronic device 600 may make amounts of currents flowing through peripheral electronic devices different from one another. As a result, the electronic device 600 may allow the peripheral electronic devices to differently perceive currents which the electronic device 600 is able to supply.

The electronic device 600 may adjust the amount of current to use each of the interfaces as a fast charge port or a normal port. An interface supplied with a current of 3 A or more may be referred to as a fast charge port (or a quick charge port). Referring to FIG. 6, the first interface 641 may be used as a fast charge port.

Hereinafter, it is assumed that the electronic device 600 may supply a total current of 6 A, one interface 641 is set to the fast charge port, and the remaining three interfaces 642, 643, and 644 are set to a normal charge port.

FIG. 6 illustrates a state in which the first peripheral electronic device, the second peripheral electronic device, and the third peripheral electronic device are connected to the interface 641, the interface 642, and the interface 643, respectively. The electronic device 600 may set the interface 641 to a fast charge port for charging with a current of 3 A and use the interface 642 and the interface 643 to a normal port for charging with a current of 1.5 A. The electronic device 600 may set the CC pin 631 to supply the charging current of 3 A to the interface 641. The electronic device 600 may set the CC pin 632 such that the interface 642 supplies a charging current of 1.5 A. The electronic device 600 may set the CC pin 631 and the CC pin 632 independently.

The electronic device 600 may cause a current of 360 µA to flow to the CC pin 631 to supply a charging current of 3 A to the first peripheral electronic device. The electronic device 600 may cause a current of 180 µA to flow to the CC pins 632 and 633 so as to supply the charging current to the second peripheral electronic device and the third peripheral electronic device.

In one embodiment, once the peripheral electronic device is connected, the electronic device 600 may perform a procedure for determining a supply power. The electronic device 600 may supply power at the request of the peripheral electronic device. For example, in a state where at least one peripheral electronic device (e.g., a first peripheral electronic device) is connected, when a peripheral electronic device (e.g., a second peripheral electronic device) is further connected, the electronic device 600 may initialize a procedure for determining a supply power. The electronic device 600 may initialize settings according to the procedure for determining the supply power. The electronic device 600 may again perform the procedure for determining the supply power. The electronic device 600 may determine power to be supplied to the first peripheral electronic device and the second peripheral electronic device, respectively.

Referring to FIG. 7, a charging operation of the electronic device 600 for the remaining peripheral electronic devices will be described for a case where charging of the first peripheral electronic device of the electronic device 600 of FIG. 6 is completed or for a case where the first peripheral electronic device is disconnected.

The electronic device 600 may redistribute a total current of 6 A when no current flows through the CC pin 631 connected to the first peripheral electronic device. For example, the total current may be redistributed when the first peripheral electronic device is fully charged or detached from the receptacle.

The electronic device 600 may distribute the current within a limit that the sum of the charge currents that may be supplied to the connected peripheral electronic devices does not exceed 6 A. The electronic device 600 may increase the charging current that may be supplied to the connected peripheral electronic devices. The electronic device 600 may control the CC pins 630 to increase the charging speeds of the remaining peripheral electronic devices. As illustrated in FIG. 7, when the second peripheral electronic device and the third peripheral electronic device only are connected, the electronic device 600 may set the CC pin 632 and the CC pin 633 such that a charging current of 3 A is respectively supplied to the second peripheral electronic device and the third peripheral electronic device. For example, the electronic device 600 may cause a current of 360 μA to flow to both the CC pin 632 and the CC pin 633, respectively. In this case, the speeds of the second peripheral electronic device and the third peripheral electronic device may also be increased as compared with the case of FIG. 6.

FIG. 8 is a diagram for explaining another example of the operation of the electronic device according to another embodiment. FIG. 8 shows a situation in which an electronic device including a control circuit with a plurality of CC pins controls a charging current through BMC communication. The operation of the electronic device 600 of FIG. 8 will be described based on the electronic device 600 described with reference to FIG. 6.

The electronic device 600 according to one embodiment may control a charging current through BMC communication. The BMC communication may be performed via a CC channel. The electronic device 600 may control the charging speed based on detailed information, such as a state of charge of each peripheral electronic device, as well as the number of peripheral electronic devices via BMC communication.

Referring to FIG. 8, the electronic device 600 may perform the BMC communication via the CC pin 630 and monitor a required power, a remaining battery level, or the like of the peripheral electronic device based on the BMC communication.

The electronic device 600 may determine an interface to perform fast charging based on detailed information of the peripheral electronic device. Here, the interface determined for fast charging may be a fast charging port.

The electronic device 600 may quickly charge a device that has a low battery level based on the monitored remaining battery level. The electronic device 600 may set the interface (e.g., 644) connected to the fourth peripheral electronic device in FIG. 8 to the fast charge port. The electronic device 600 may set the maximum power or the maximum current to be supplied to the fourth peripheral electronic device to a value higher than the maximum power or the maximum current to be supplied to the first to third peripheral electronic devices.

The electronic device 600 may normally charge a device with a sufficient remaining battery level based on the monitored remaining battery level. The electronic device 600 may set the interface (e.g., 643) connected to the third peripheral electronic device in FIG. 8 to a normal charge port. The electronic device 600 may set the maximum power or the maximum current to be supplied to the third peripheral electronic device to a value lower than the maximum power or the maximum current to be supplied to the fourth peripheral electronic device. As a result, the charging time of the entire peripheral electronic device may be shortened.

In addition, the electronic device 600 may be set such that a user is able to select and uses a desired scenario. To this end, each peripheral electronic device or the electronic device 600 may include an interface for user selection.

The electronic device 600 may monitor the required power, the remaining battery level, AC connection, and the like of the peripheral electronic device using the PD protocol. Tables 6 to 9 show information that the electronic device may monitor.

Table 5 shows PDO (power object data). The PDO may be identified by both the source port and the sink port (i.e., electronic device and peripheral electronic device). For example, the electronic device 600 may receive the PDO and determine whether an external power source is connected based on the B27 bit corresponding to Externally powered.

TABLE 5

| Bit(s) | Description |
|---|---|
| B31 ... 30 | Fixed Supply |
| B29 | Dual-Role Power |
| B28 | USB Suspend Supported |
| B27 | Externally Powered |
| B26 | USB Communications Capable |
| B25 | Dual-Role Data |
| B24 ... 22 | Reserved-shall be set to zero |
| B21 ... 20 | Peak Current |
| B19 ... 10 | Voltage in 50 mV units |
| B9 ... 0 | Maximum Current in 10 mA units |

Table 6 shows the battery request data object (BRDA). The electronic device 600 may monitor the power required for operation of the peripheral electronic device and maximum power.

TABLE 6

| Bit(s) | Description |
|---|---|
| B31 | Reserved-shall be set to zero |
| B30 ... 28 | Object position(000b is Reserved and shall not be used) |
| B27 | GiveBackFlag = 0 |
| B26 | Capability Mismatch |
| B25 | USB Communications Capable |
| B24 | No USB Suspend |
| B23 ... 20 | Reserved-shall be set to zero |
| B19 ... 10 | Operating Power in 250 mW units |
| B9 ... 0 | Maximum Operating Power in 250 mW units |

Table 7 shows request fields for battery status check. Table 8 shows some of a battery status structure (0 to 1 of offset indexes 0 to 6). The electronic device 600 may identify a battery status of the peripheral electronic device using Table 7 and Table 8 below. For example, the electronic device 600 may monitor the charging status and the remaining battery level %.

TABLE 7

| bmRequestType | bRequest | wValue | wIndex | wLength | Data |
|---|---|---|---|---|---|
| 10000000B | GET_BATTERY_STATUS | Zero | Battery ID | Eight | Battery Status |

TABLE 8

| offset | Field | Size | Value | Description |
|---|---|---|---|---|
| 0 | bBatteryAttributes | 1 | Number | Shall indicate whether a Battery is installed and whether this is charging or discharging *value: describtion<br>0: there is no battery<br>1: the battery is charging<br>2: the battery is discharging<br>3: the battery is neither discharging nor charging<br>255-4: reserved and shall not be used |
| 1 | bBatterySOC | 1 | Number | Shall indicate the Battery State of Charge given percentage value from Battery Remaining Capacity |

Based on the above-described method, the electronic device may control the amount of current in accordance with the situation. The electronic device may share power efficiently.

Although the electronic device 400 and the electronic device 600 have been described in the various embodiments based on the electronic device 100, the concepts proposed in the disclosure may also be applied to the connection device 300.

When applied to the connection device 300, the electronic device 400 and the electronic device 600 may supply power received from an external device (e.g., the electronic device 100) to the peripheral electronic devices. In addition, the power supply circuits of the electronic device 400 and the electronic device 600 may supply the received power to the peripheral electronic devices.

Figure 9:
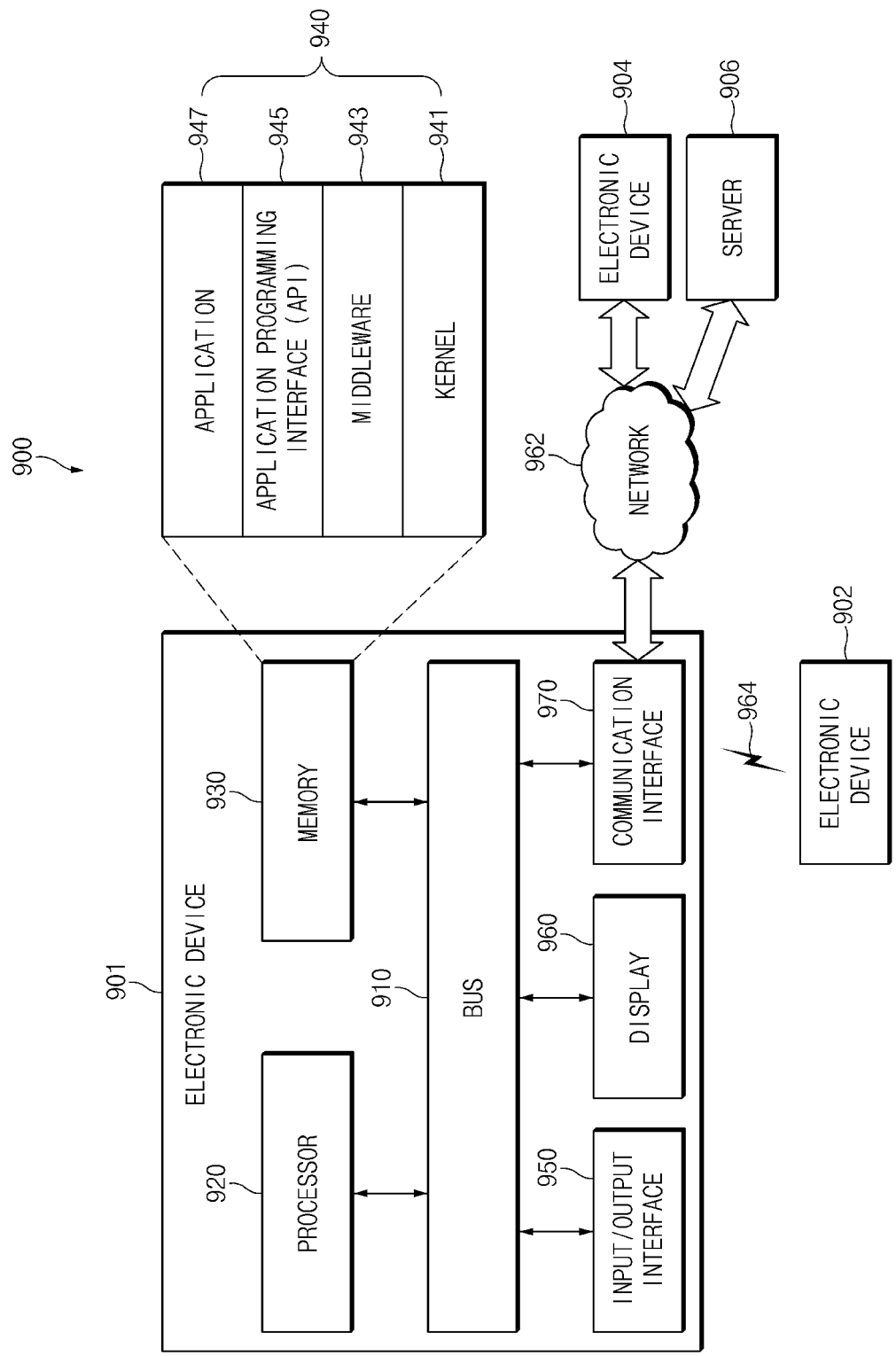
FIG. 9 illustrates an electronic device in a network environment, according to various embodiments.

FIG. 9 illustrates an electronic device in a network environment, according to various embodiments.

Referring to FIG. 9, according to various embodiments, an electronic device 901, a first electronic device 902, a second electronic device 904, or a server 906 may be connected each other over a network 962 or a short range communication 964. The electronic device 901 may include a bus 910, a processor 920, a memory 930, an input/output interface 950, a display 960, and a communication interface 970. According to an embodiment, the electronic device 901 may not include at least one of the above-described components or may further include other component(s).

For example, the bus 910 may interconnect the above-described components 910 to 970 and may include a circuit for conveying communications (e.g., a control message and/or data) among the above-described components.

The processor 920 may include one or more of a central processing unit (CPU), an application processor (AP), or a communication processor (CP). For example, the processor 920 may perform an arithmetic operation or data processing associated with control and/or communication of at least other components of the electronic device 901.

The memory 930 may include a volatile and/or nonvolatile memory. For example, the memory 930 may store commands or data associated with at least one other component(s) of the electronic device 901. According to an embodiment, the memory 930 may store software and/or a program 940. The program 940 may include, for example, a kernel 941, a middleware 943, an application programming interface (API) 945, and/or an application program (or "an application") 947. At least a part of the kernel 941, the middleware 943, or the API 945 may be referred to as an "operating system (OS)".

For example, the kernel 941 may control or manage system resources (e.g., the bus 910, the processor 920, the memory 930, and the like) that are used to execute operations or functions of other programs (e.g., the middleware 943, the API 945, and the application program 947). Furthermore, the kernel 941 may provide an interface that allows the middleware 943, the API 945, or the application program 947 to access discrete components of the electronic device 901 so as to control or manage system resources.

The middleware 943 may perform, for example, a mediation role such that the API 945 or the application program 947 communicates with the kernel 941 to exchange data.

Furthermore, the middleware 943 may process task requests received from the application program 947 according to a priority. For example, the middleware 943 may assign the priority, which makes it possible to use a system resource (e.g., the bus 910, the processor 920, the memory 930, or the like) of the electronic device 901, to at least one of the application program 947. For example, the middleware 943 may process the one or more task requests according to the priority assigned to the at least one, which makes it possible to perform scheduling or load balancing on the one or more task requests.

The API 945 may be, for example, an interface through which the application program 947 controls a function provided by the kernel 941 or the middleware 943, and may include, for example, at least one interface or function (e.g., an instruction) for a file control, a window control, image processing, a character control, or the like.

The input/output interface 950 may play a role, for example, of an interface which transmits a command or data input from a user or another external device, to other component(s) of the electronic device 901. Furthermore, the input/output interface 950 may output a command or data, received from other component(s) of the electronic device 901, to a user or another external device.

The display 960 may include, for example, a liquid crystal display (LCD), a light-emitting diode (LED) display, an organic LED (OLED) display, a microelectromechanical systems (MEMS) display, or an electronic paper display. The display 960 may display, for example, various contents (e.g., a text, an image, a video, an icon, a symbol, and the like) to a user. The display 960 may include a touch screen and may receive, for example, a touch, gesture, proximity, or hovering input using an electronic pen or a part of a user's body.

For example, the communication interface 970 may establish communication between the electronic device 901 and an external device (e.g., the first electronic device 902, the second electronic device 904, or the server 906). For example, the communication interface 970 may be connected to the network 962 over wireless communication or wired communication to communicate with the external device (e.g., the second electronic device 904 or the server 906).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 964. The short range communication 964 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 901 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 962 may include at least one of telecommunications networks, for example, a computer network (e.g., LAN or WAN), an Internet, or a telephone network.

Each of the first and second electronic devices 902 and 904 may be a device of which the type is different from or the same as that of the electronic device 901. According to an embodiment, the server 906 may include a group of one or more servers. According to various embodiments, all or a portion of operations that the electronic device 901 will perform may be executed by another or plural electronic devices (e.g., the first electronic device 902, the second electronic device 904 or the server 906). According to an embodiment, in the case where the electronic device 901 executes any function or service automatically or in response to a request, the electronic device 901 may not perform the function or the service internally, but, alternatively additionally, it may request at least a portion of a function associated with the electronic device 901 from another device (e.g., the electronic device 902 or 904 or the server 906). The other electronic device may execute the requested function or additional function and may transmit the execution result to the electronic device 901. The electronic device 901 may provide the requested function or service using the received result or may additionally process the received result to provide the requested function or service. To this end, for example, cloud computing, distributed computing, or client-server computing may be used.

Figure 10:
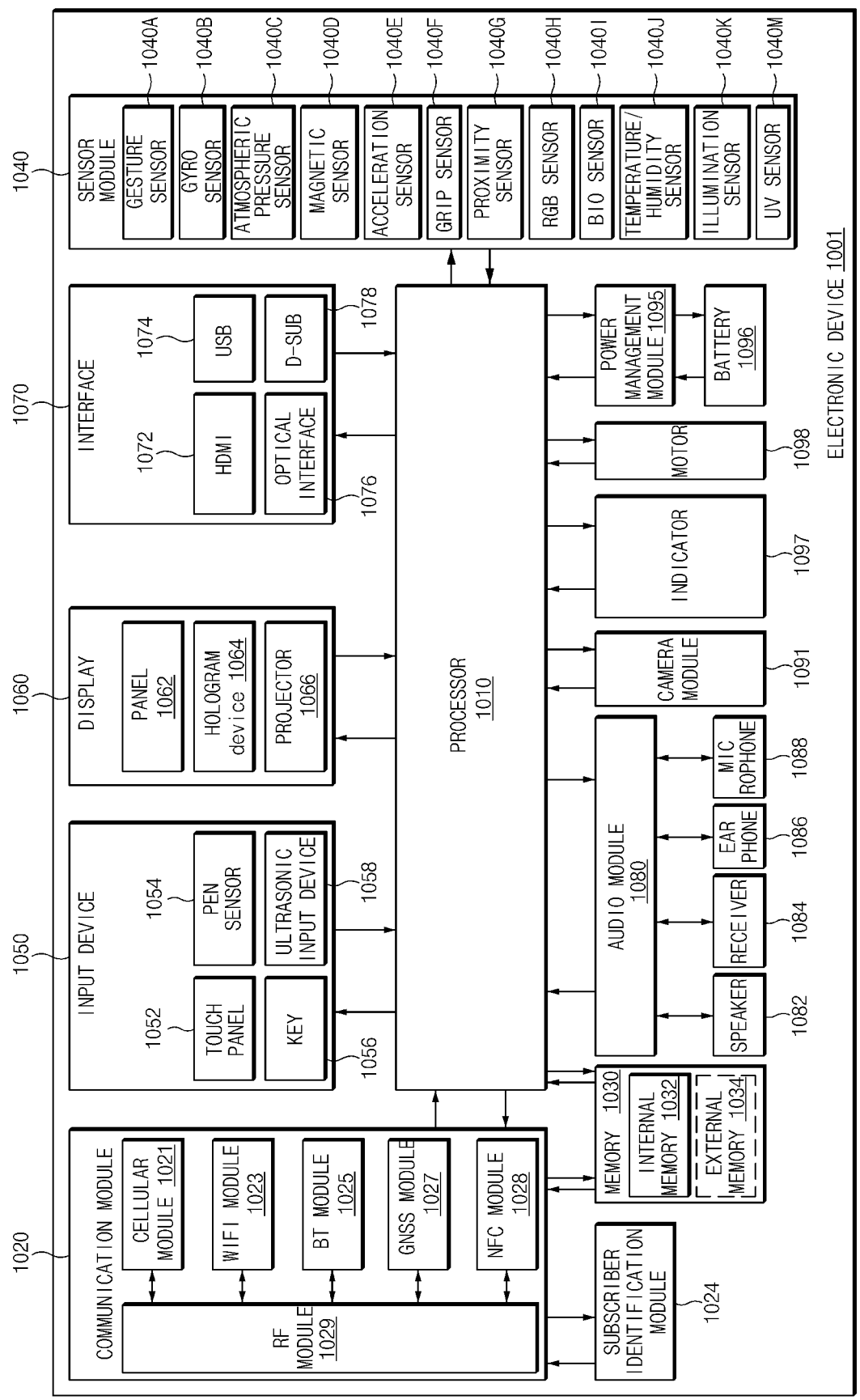
FIG. 10 illustrates a block diagram of an electronic device, according to various embodiments.

FIG. 10 illustrates a block diagram of an electronic device, according to various embodiments.

Referring to FIG. 10, an electronic device 1001 may include, for example, all or a part of the electronic device 101 illustrated in FIG. 9. The electronic device 1001 may include one or more processors (e.g., an application processor (AP)) 1010, a communication module 1020, a subscriber identification module 1024, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010 may drive, for example, an operating system (OS) or an application to control a plurality of hardware or software components connected to the processor 1010 and may process and compute a variety of data. For example, the processor 1010 may be implemented with a System on Chip (SoC). According to an embodiment, the processor 1010 may further include a graphic processing unit (GPU) and/or an image signal processor. The processor 1010 may include at least a part (e.g., a cellular module 1021) of components illustrated in FIG. 10. The processor 1010 may load a command or data, which is received from at least one of other components (e.g., a nonvolatile memory), into a volatile memory and process the loaded command or data. The processor 1010 may store a variety of data in the nonvolatile memory.

The communication module 1020 may be configured the same as or similar to the communication interface 970 of FIG. 9. The communication module 1020 may include the cellular module 1021, a Wi-Fi module 1022, a Bluetooth (BT) module 1023, a GNSS module 1024 (e.g., a GPS module, a Glonass module, a Beidou module, or a Galileo module), a near field communication (NFC) module 1025, a MST module 1026 and a radio frequency (RF) module 1027.

The cellular module 1021 may provide, for example, voice communication, video communication, a character service, an Internet service, or the like over a communication network. According to an embodiment, the cellular module 1021 may perform discrimination and authentication of the electronic device 1001 within a communication network by using the subscriber identification module (e.g., a SIM card) 1029. According to an embodiment, the cellular module 1021 may perform at least a portion of functions that the processor 1010 provides. According to an embodiment, the cellular module 1021 may include a communication processor (CP).

Each of the Wi-Fi module 1022, the BT module 1023, the GNSS module 1024, the NFC module 1025, or the MST module 1026 may include a processor for processing data exchanged through a corresponding module, for example. According to an embodiment, at least a part (e.g., two or more) of the cellular module 1021, the Wi-Fi module 1022, the BT module 1023, the GNSS module 1024, the NFC module 1025, or the MST module 1026 may be included within one Integrated Circuit (IC) or an IC package.

For example, the RF module 1027 may transmit and receive a communication signal (e.g., an RF signal). For example, the RF module 1027 may include a transceiver, a power amplifier module (PAM), a frequency filter, a low noise amplifier (LNA), an antenna, or the like. According to another embodiment, at least one of the cellular module 1021, the Wi-Fi module 1022, the BT module 1023, the GNSS module 1024, the NFC module 1025, or the MST module 1026 may transmit and receive an RF signal through a separate RF module.

The subscriber identification module 1029 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1030 (e.g., the memory 130) may include an internal memory 1032 or an external memory 1034. For example, the internal memory 1032 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1034 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1034 may be operatively and/or physically connected to the electronic device 1001 through various interfaces.

A security module 1036 may be a module that includes a storage space of which a security level is higher than that of the memory 1030 and may be a circuit that guarantees safe data storage and a protected execution environment. The security module 1036 may be implemented with a separate circuit and may include a separate processor. For example, the security module 1036 may be in a smart chip or a secure digital (SD) card, which is removable, or may include an embedded secure element (eSE) embedded in a fixed chip of the electronic device 1001. Furthermore, the security module 1036 may operate based on an operating system (OS) that is different from the OS of the electronic device 1001. For example, the security module 1036 may operate based on java card open platform (JCOP) OS.

The sensor module 1040 may measure, for example, a physical quantity or may detect an operation state of the electronic device 1001. The sensor module 1040 may convert the measured or detected information to an electric signal. For example, the sensor module 1040 may include at least one of a gesture sensor 1040A, a gyro sensor 1040B, a barometric pressure sensor 1040C, a magnetic sensor 1040D, an acceleration sensor 1040E, a grip sensor 1040F, the proximity sensor 1040G, a color sensor 1040H (e.g., red, green, blue (RGB) sensor), a biometric sensor 1040I, a temperature/humidity sensor 1040J, an illuminance sensor 1040K, or an UV sensor 1040M. Although not illustrated, additionally or alternatively, the sensor module 1040 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1040 may further include a control circuit for controlling at least one or more sensors included therein. According to an embodiment, the electronic device 1001 may further include a processor that is a part of the processor 1010 or independent of the processor 1010 and is configured to control the sensor module 1040. The processor may control the sensor module 1040 while the processor 1010 remains at a sleep state.

The input device 1050 may include, for example, a touch panel 1052, a (digital) pen sensor 1054, a key 1056, or an ultrasonic input unit 1058. For example, the touch panel 1052 may use at least one of capacitive, resistive, infrared and ultrasonic detecting methods. Also, the touch panel 1052 may further include a control circuit. The touch panel 1052 may further include a tactile layer to provide a tactile reaction to a user.

The (digital) pen sensor 1054 may be, for example, a part of a touch panel or may include an additional sheet for recognition. The key 1056 may include, for example, a physical button, an optical key, a keypad, or the like. The ultrasonic input device 1058 may detect an ultrasonic signal, which is generated from an input device, through a microphone (e.g., a microphone 1088) and may identify data corresponding to the detected ultrasonic signal.

The display 1060 (e.g., the display 160) may include a panel 1062, a hologram device 1064, or a projector 1066. The panel 1062 may be the same as or similar to the display 960 illustrated in FIG. 9. The panel 1062 may be implemented, for example, to be flexible, transparent or wearable. The panel 1062 and the touch panel 1052 may be integrated into a single module. The hologram device 1064 may display a stereoscopic image in a space using a light interference phenomenon. The projector 1066 may project light onto a screen so as to display an image. For example, the screen may be arranged in the inside or the outside of the electronic device 1001. According to an embodiment, the display 1060 may further include a control circuit for controlling the panel 1062, the hologram device 1064, or the projector 1066.

The interface 1070 may include, for example, a high-definition multimedia interface (HDMI) 1072, a universal serial bus (USB) 1074, an optical interface 1076, or a D-subminiature (D-sub) 1078. The interface 1070 may be included, for example, in the communication interface 970 illustrated in FIG. 9. Additionally or alternatively, the interface 1070 may include, for example, a mobile high definition link (MHL) interface, a SD card/multimedia card (MMC) interface, or an infrared data association (IrDA) standard interface.

The audio module 1080 may convert a sound and an electric signal in dual directions. At least a component of the audio module 1080 may be included, for example, in the input/output interface 950 illustrated in FIG. 9. The audio module 1080 may process, for example, sound information that is input or output through a speaker 1082, a receiver 1084, an earphone 1086, or the microphone 1088.

For example, the camera module 1091 may shoot a still image or a video. According to an embodiment, the camera module 1091 may include at least one or more image sensors (e.g., a front sensor or a rear sensor), a lens, an image signal processor (ISP), or a flash (e.g., an LED or a xenon lamp).

The power management module 1095 may manage, for example, power of the electronic device 1001. According to an embodiment, a power management integrated circuit (PMIC), a charger IC, or a battery or fuel gauge may be included in the power management module 1095. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1096 and a voltage, current or temperature thereof while the battery is charged. The battery 1096 may include, for example, a rechargeable battery and/or a solar battery.

The indicator 1097 may display a specific state of the electronic device 1001 or a part thereof (e.g., the processor 1010), such as a booting state, a message state, a charging state, and the like. The motor 1098 may convert an electrical signal into a mechanical vibration and may generate the following effects: vibration, haptic, and the like. Although not illustrated, a processing device (e.g., a GPU) for supporting a mobile TV may be included in the electronic device 1001. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 11:
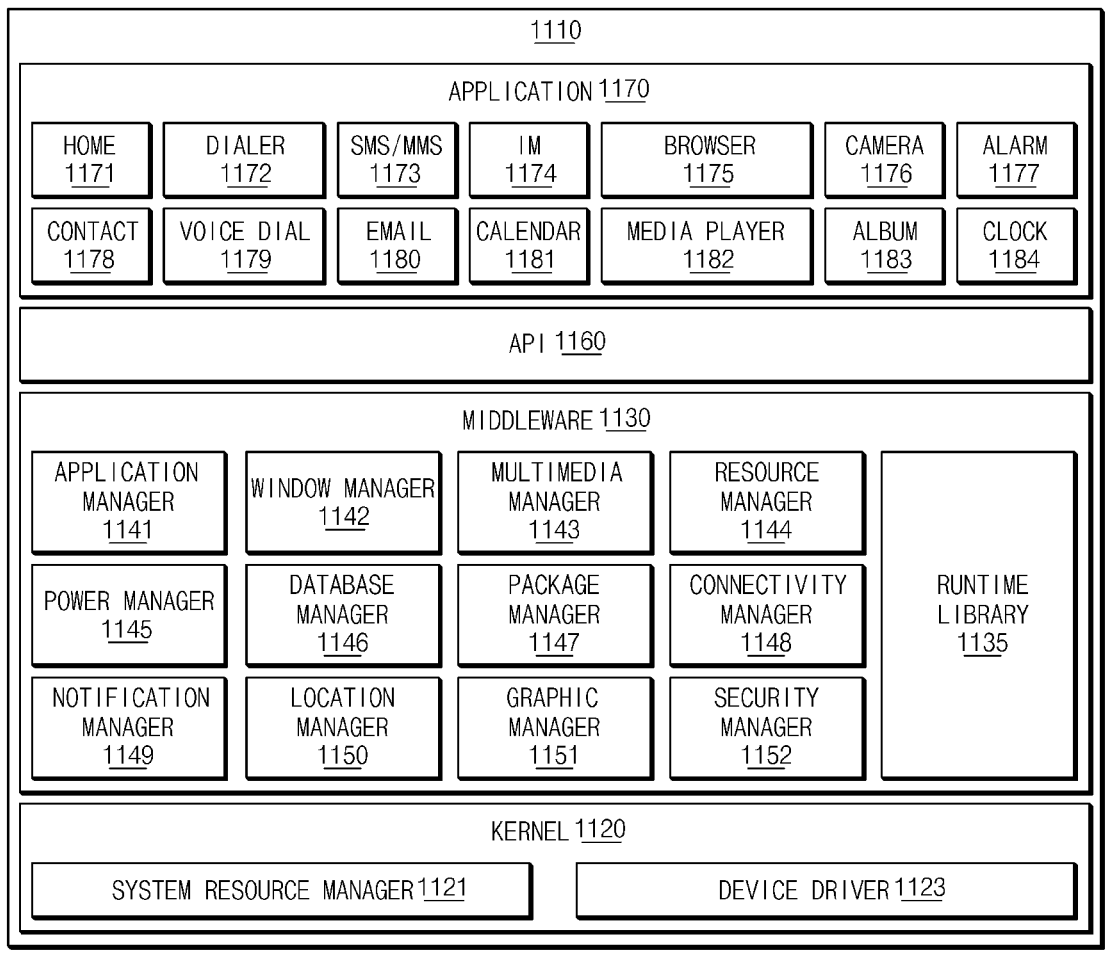
FIG. 11 illustrates a block diagram of a program module, according to various embodiments.

FIG. 11 illustrates a block diagram of a program module, according to various embodiments.

According to an embodiment, a program module 1110 (e.g., the program 940) may include an operating system (OS) to control resources associated with an electronic device (e.g., the electronic device 901), and/or diverse applications (e.g., the application program 147) driven on the OS. The OS may be, for example, Android™, iOS™, Windows™, Symbian™, or Tizen™.

The program module 1110 may include a kernel 1120, a middleware 1130, an application programming interface (API) 1160, and/or an application 1170. At least a portion of the program module 1110 may be preloaded on an electronic device or may be downloadable from an external electronic device (e.g., the first electronic device 902, the second electronic device 904, the server 906, or the like).

The kernel 1120 (e.g., the kernel 941) may include, for example, a system resource manager 1121 or a device driver 1123. The system resource manager 1121 may perform control, allocation, or retrieval of system resources. According to an embodiment, the system resource manager 1121 may include a process managing unit, a memory managing unit, or a file system managing unit. The device driver 1123 may include, for example, a display driver, a camera driver, a Bluetooth driver, a shared memory driver, a USB driver, a keypad driver, a Wi-Fi driver, an audio driver, or an inter-process communication (IPC) driver.

The middleware 1130 may provide, for example, a function that the application 1170 needs in common, or may provide diverse functions to the application 1170 through the API 1160 to allow the application 1170 to efficiently use limited system resources of the electronic device. According to an embodiment, the middleware 1130 (e.g., the middleware 143) may include at least one of a runtime library 1135, an application manager 1141, a window manager 1142, a multimedia manager 1143, a resource manager 1164, a power manager 1145, a database manager 1146, a package manager 1147, a connectivity manager 1148, a notification manager 1149, a location manager 1150, a graphic manager 1151, a security manager 1152, or a payment manager 1154.

The runtime library 1135 may include, for example, a library module that is used by a compiler to add a new function through a programming language while the application 1170 is being executed. The runtime library 1135 may perform input/output management, memory management, or capacities about arithmetic functions.

The application manager 1141 may manage, for example, a life cycle of at least one application of the application 1170. The window manager 1142 may manage a graphic user interface (GUI) resource that is used in a screen. The multimedia manager 1143 may identify a format necessary for playing diverse media files, and may perform encoding or decoding of media files by using a codec suitable for the format. The resource manager 1164 may manage resources such as a storage space, memory, or source code of at least one application of the application 1170.

The power manager 1145 may operate, for example, with a basic input/output system (BIOS) to manage a battery or power, and may provide power information for an operation of an electronic device. The database manager 1146 may generate, search for, or modify database that is to be used in at least one application of the application 1170. The package manager 1147 may install or update an application that is distributed in the form of package file.

The connectivity manager 1148 may manage, for example, wireless connection such as Wi-Fi or Bluetooth. The notification manager 1149 may display or notify an event such as arrival message, appointment, or proximity notification in a mode that does not disturb a user. The location manager 1150 may manage location information about an electronic device. The graphic manager 1151 may manage a graphic effect that is provided to a user, or manage a user interface relevant thereto. The security manager 1152 may provide a general security function necessary for system security, user authentication, or the like. According to an embodiment, in the case where an electronic device (e.g., the electronic device 901) includes a telephony function, the middleware 1130 may further include a telephony manager for managing a voice or video call function of the electronic device.

The middleware 1130 may include a middleware module that combines diverse functions of the above-described components. The middleware 1130 may provide a module specialized to each OS kind to provide differentiated functions. Additionally, the middleware 1130 may dynamically remove a part of the preexisting components or may add new components thereto.

The API 1160 (e.g., the API 945) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 1170 (e.g., the application program 947) may include, for example, one or more applications capable of providing functions for a home 1171, a dialer 1172, an SMS/MMS 1173, an instant message (IM) 1174, a browser 1175, a camera 1176, an alarm 1177, a contact 1178, a voice dial 1179, an e-mail 1180, a calendar 1181, a media player 1182, an album 1183, or a timepiece 1184 or for offering health care (e.g., measuring an exercise quantity, blood sugar, or the like) or environment information (e.g., information of barometric pressure, humidity, temperature, or the like).

According to an embodiment, the application 1170 may include an application (hereinafter referred to as "information exchanging application" for descriptive convenience) to support information exchange between an electronic device (e.g., the electronic device 901) and an external electronic device (e.g., the first electronic device 902 or the second electronic device 904). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1170 may include an application (e.g., a health care application of a mobile medical device) that is assigned in accordance with an attribute of an external electronic device. According to an embodiment, the application 1170 may include an application that is received from an external electronic device (e.g., the first electronic device 902, the second electronic device 904, or the server 906). According to an embodiment, the application 1170 may include a preloaded application or a third party application that is downloadable from a server. The names of components of the program module 1110 according to the embodiment may be modifiable depending on kinds of operating systems.

According to various embodiments, at least a portion of the program module 1110 may be implemented by software, firmware, hardware, or a combination of two or more thereof. At least a portion of the program module 1110 may be implemented (e.g., executed), for example, by the processor (e.g., the processor 1010). At least a portion of the program module 1110 may include, for example, modules, programs, routines, sets of instructions, processes, or the like for performing one or more functions.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 920), may cause the one or more processors to perform a function corresponding to the instruction. The computer-readable storage media, for example, may be the memory 930.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a plurality of interfaces each configured to be connected to one peripheral electronic device in a wired manner to deliver power to the connected peripheral electronic device;
a power supply circuit connected to the plurality of interfaces; and
a control circuit including a plurality of pins each connected to one interface to allow the power supply circuit to supply power to the plurality of interfaces,
wherein the control circuit is configured to:
determine a first maximum charging current capable of being supplied to a first peripheral electronic device connected to a first interface of the plurality of interfaces; and
determine a second maximum charging current capable of being supplied to a second peripheral electronic device connected to a second interface of the plurality of interfaces.

2. The electronic device of claim 1, wherein the plurality of pins is configured to obtain information on the connected peripheral electronic device.

3. The electronic device of claim 1, wherein the control circuit is configured to determine the first maximum charging current and the second maximum charging current to be different values.

4. The electronic device of claim 1, wherein the control circuit is configured to increase the second maximum charging current when recognizing disconnection of the first peripheral electronic device.

5. The electronic device of claim 1, wherein he control circuit is configured to:
perform a first procedure for determining power to be supplied from the power supply circuit when recognizing connection of a first peripheral device, and
initialize settings related to the first procedure and perform a second procedure for determining power to be supplied from the power supply circuit when recognizing connection of a second peripheral device to the second interface in a state where the first peripheral device is connected.

6. The electronic device of claim 1, wherein a sum of the first maximum charging current and the second maximum charging current is less than or equal to a value of a maximum charging current capable of being supplied by the power supply circuit.

7. The electronic device of claim 1, wherein the control circuit is configured to receive information on a battery status from a peripheral electronic device connected to a first interface of the plurality of interfaces and determine at least one of a first maximum charging current or a maximum power to be supplied to the peripheral electronic device connected to the first interface based on the information on the battery status.

8. The electronic device of claim 7, wherein the control circuit is configured to transfer information on the first maximum charging current to the peripheral electronic device connected to the first interface.

9. The electronic device of claim 7, wherein the control circuit is configured to receive the information on the battery status through a bi-phase mark code (BMC).

10. The electronic device of claim 7, wherein the information on the battery status includes at least one of battery remaining capacity information and power information necessary for the peripheral electronic device.

11. The electronic device of claim 3, wherein the control circuit is configured to determine the first maximum current and the second maximum current based on a number of peripheral electronic devices connected to the electronic device.

12. The electronic device of claim 1, wherein the power supply circuit is configured to supply power via VBUS.

* * * * *